United States Patent
Kurtz et al.

(10) Patent No.: US 8,693,055 B2
(45) Date of Patent: Apr. 8, 2014

(54) PRINTED DYNAMIC ANAGLYPH IMAGE METHOD

(75) Inventors: Andrew F. Kurtz, Macedon, NY (US); Andrew Charles Gallagher, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 114 days.

(21) Appl. No.: 13/403,004

(22) Filed: Feb. 23, 2012

(65) Prior Publication Data

US 2013/0222822 A1    Aug. 29, 2013

(51) Int. Cl.
  *G06F 15/00* (2006.01)
  *G06K 1/00* (2006.01)
  *G06K 15/00* (2006.01)
  *H04N 1/46* (2006.01)

(52) U.S. Cl.
  USPC .......................... 358/1.9; 358/515; 358/1.18

(58) Field of Classification Search
  USPC .................................................. 358/1.1–1.9
  See application file for complete search history.

(56) References Cited

U.S. PATENT DOCUMENTS

| | | | |
|---|---|---|---|
| 544,666 A | 8/1895 | DuHauron | |
| 2,135,197 A | 11/1938 | Norling | |
| 4,620,770 A | 11/1986 | Wexler | |
| 6,054,256 A * | 4/2000 | Nohr et al. | 430/339 |
| 6,139,779 A | 10/2000 | Small et al. | |
| 6,389,236 B1 | 5/2002 | Western | |
| 6,561,646 B2 | 5/2003 | Silliphant | |
| 6,687,003 B1 | 2/2004 | Sorensen et al. | |
| 2004/0125447 A1 * | 7/2004 | Sato et al. | 359/462 |
| 2009/0278919 A1 | 11/2009 | Ramstad | |

OTHER PUBLICATIONS

"*Choice of Inks for Printed Anaglyphs*", by W. Cox, published in Applied Optics, vol. 16, pp. 2586 (1977).
"*Comparing levels of crosstalk with red/cyan, blue/yellow, and green/magenta anaglyph 3D glasses*", by A. Woods et al., published in SPIE vol. 7254, pp. 75240Q-1-75240Q-12 (2010).
"*A Perceptual Model for Disparity*", by P. Didyk et al., ACM Transactions on Graphics, vol. 30(4) (Proceedings SIGGRAPH 2011).
"*Chromatic Properties of Thermochromic Inks*", by L. Johansson (TAGA Proceedings, 2006) and "*Thermochromic Inks—Dynamic Colour Possibilities*", by R. Kulcar et al., (Proc. CREATE Conference, pp. 202-206, 2010).
"*Colorimetric properties of reversible thermochromic printing inks*", by Kulcar et al. (Dyes and Pigments, vol. 86, pp. 271-277, 2010).
"*The Reproduction of Colour, Sixth Edition*" by R. W. G. Hunt, by Fountain Press Ltd.(), and the "Digital Color Imaging Handbook" by Gaurav Sharma, CRC Press (2003).

\* cited by examiner

*Primary Examiner* — King Poon
*Assistant Examiner* — Ibrahim Siddo
(74) *Attorney, Agent, or Firm* — Roland R. Schindler, II

(57) ABSTRACT

Methods are described that provide dynamic anaglyph images with a first appearance state and a second appearance state. At least one mutable colorant and at least one non-mutable colorant are selected for a colorant type map so that the printed dynamic anaglyph image has a first appearance state in which the at least one mutable colorant is in the first colorant state and is color matched to at least one of a left eye information and a right eye information and so that in the second appearance state printed the mutable colorant is in a second colorant state in which the at least one mutable colorant provides a color that spectrally overlaps a spectral filter in one eye of a pair of stereo color glasses so that three dimensional effects can be perceived.

27 Claims, 20 Drawing Sheets

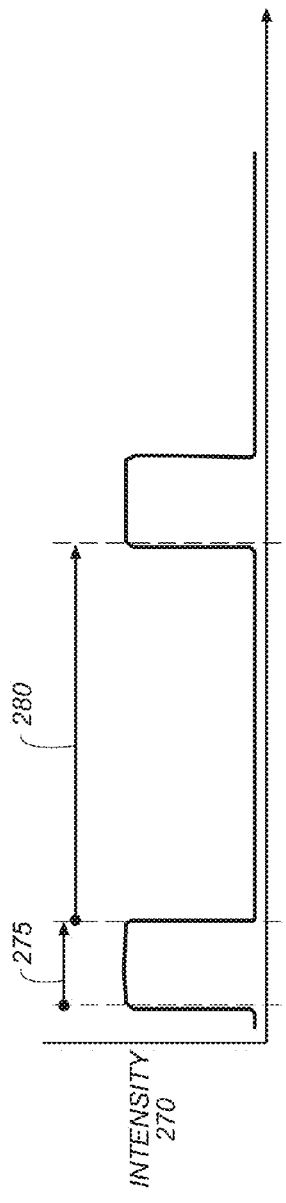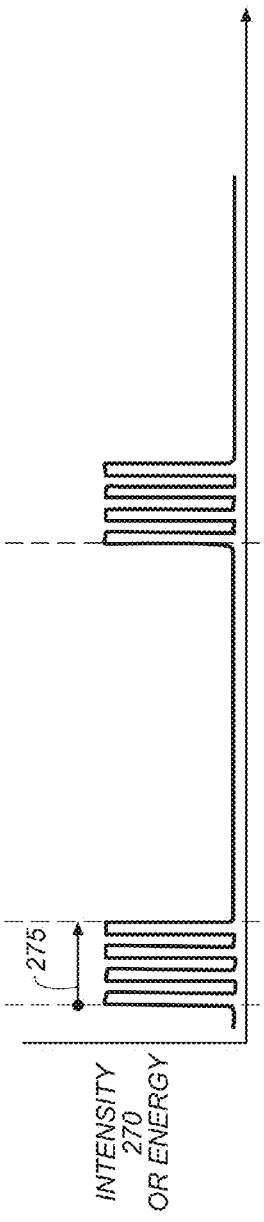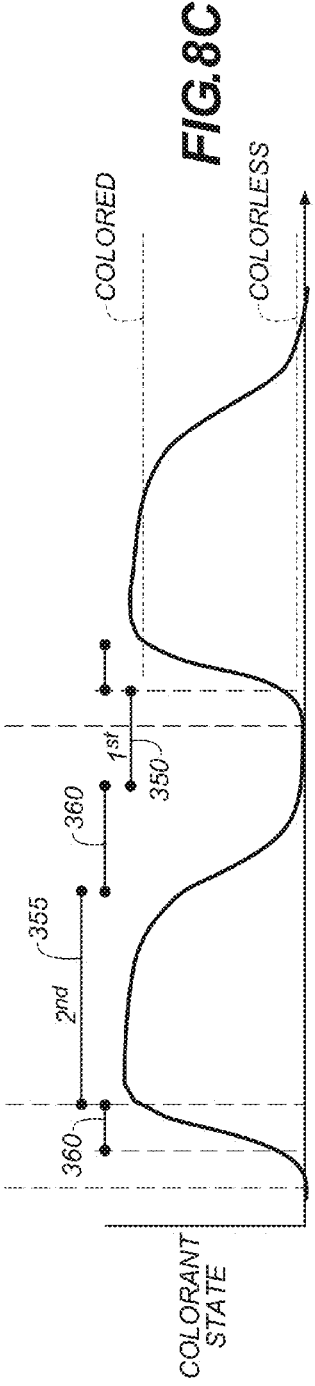

PRINTED DYNAMIC ANAGLYPH IMAGE METHOD

CROSS REFERENCE TO RELATED APPLICATIONS

This application relates to commonly assigned, copending U.S. application Ser. No. 13/402,985, filed Feb. 23, 2012, entitled: "DYNAMIC ANAGLYPHIC PRINTS"; U.S. application Ser. No. 13/403,017, filed Feb. 23, 2012, entitled: "DYNAMIC ANAGLYPH DESIGN APPARATUS"; U.S. application Ser. No. 13/051,024, filed Mar. 18, 2011, entitled: "PRODUCING ENHANCED IMAGES FROM ANAGLYPH IMAGES", and U.S. application Ser. No. 13/181,760, filed Jul. 13, 2011, entitled: "METHOD FOR PROVIDING DYNAMIC OPTICAL ILLUSION IMAGES" each of which is hereby incorporated by reference.

FIELD OF THE INVENTION

This invention pertains to the field of printed anaglyphic images.

BACKGROUND OF THE INVENTION

Anaglyphs are the earliest of several systems used to bring the illusion of depth to two dimensional images. Stereopsis (from stereo-meaning "solid" or "three-dimensional" (3D), and opsis meaning view or sight) is the process in visual perception leading to the perception of depth from the two slightly different projections of the world onto the retinas of the two eyes. The image differences arise from the eyes' different positions in the head (the inter-pupillary distance). The displacement of objects resulting from the different points of view of the two eyes is called binocular disparity, horizontal disparity, or retinal disparity. The image differences help enable 3D image perception due to parallax, or the apparent displacement or difference in the apparent position of an object viewed along two different lines of sight.

Anaglyph images can be viewed directly on a display or as printed images. In general, an anaglyph is a stereoscopic image generally consisting of two distinctly colored, and preferably, complementary colored, prints or drawings that comprise superimposed left and right eye images. In particular, each image is color coded and viewed through a suitably colored filter, so each eye sees only its own image. For example, when a red line on white paper is viewed through a red filter, it disappears within the white surround, while a green or cyan line viewed through the same filter is dark and clearly visible. Typically the inks used are usually roughly complementary (red and green, orange and green, or red and cyan), while the filters are either red and green or red and cyan. Although the two views or source images are complete and show all or nearly all features of the scene, the two images of the scene are captured at positions roughly similar to the relative positions of the left and right eyes from human vision. In appearance, content in one of the image of an anaglyph image appears to be shifted relative to the other image. These shifts, the binocular disparity, exhibit the color fringing or ghosting seen in an anaglyph image looked that is examined as a two-dimensional (2D) image. In the anaglyph process, an observer wears glasses with two different colored lenses to filter the different images to the correct eye and produce a 3D effect. That is, the disparity or horizontal displacement between objects in the cyan and red images results in stereoscopic sensation of depth.

Traditionally, a stereo pair is made by capturing a scene with two horizontally displaced cameras, each of which images through an optical filter to capture the color separation images. With modern image processing software, stereo images can also be created by post-capture processing images captured by a single camera. To clarify traditional camera-based capture, FIG. 1A depicts an illustrative left eye source image 60 of a boy and girl captured from a left camera position (shown as left camera position 90 in FIG. 1D) and a right eye source image 65 of the same scene captured from the right camera position 95 (again FIG. 1D) is shown as FIG. 1B. It should be understood that the distance between the left eye camera position 90 and the right eye camera position 95 is typically equivalent to the human interocular distance but can be a greater or smaller distance depending on the sense of perspective that is desired. These source images are composed to produce an anaglyph image 50 (illustrated as FIG. 1C) with a red image channel 62 equal to the red channel of FIG. 1A, and with green and blue image channels 64 equal to the green and blue channels (respectively) of FIG. 1B. As shown in FIG. 1C, the anaglyph image 50 appears as two overlapped but offset images, whose offsets are exaggerated for clarity.

When an anaglyph is viewed, a color filter over each eye only transmits the image component suitable for that eye and the brain of an observer fuses the images and interprets the result in three dimensions (3D). Typically, observers wear stereo glasses 40 (e.g. 3D glasses or multi-view glasses), shown in FIG. 2A, which use filters (usually inexpensive gel color filters) such as a left eye filter 46 and right eye filter 48 to provide different color filtering for each eye. For example, one eye's filter blocks first portions of the visible spectrum and transmits second portions, while the second eye's filter is generally inverted to transmit the first portions and block the second portions. Usually the main subject is in the center, while the foreground and background appear to have been shifted laterally relative to the other view and in opposite directions. Most commonly, anaglyphs are viewed with colored stereo glasses 40, as exemplified by those shown in FIG. 2A, having a red left eye filter 46 and a cyan right eye filter 48, although various other filter combinations, including blue or green filters, are used.

FIGS. 2B and 2C depict exemplary transmission spectra for a set of available red filters 43 that can be used as left eye filter 46 and exemplary transmission spectra for a set of available cyan filters 44 used in right eye filter 48 of stereo glasses 40. The red filters 43 substantially transmit red light, while substantially blocking blue and green light, but varying degrees depending on the filter. Thus, the red left eye filter 46 shows red image areas or highlights from white image areas as bright image areas. On the other hand, image areas that are black or cyan (or blue or green) all appear as dark (grey to black) through the red left eye filter 46. Similarly, cyan filters 44 (FIG. 2C) provide a view through right eye filter 48 that sees cyan light but not red light. When the image content includes left and right source images 60 and 65, color coded to work with anaglyph stereo glasses 40, a three dimensional image providing a sense of depth can be perceived by an observer wearing glasses 40.

In particular, as shown in FIG. 2D, left and right source images 60 and 65 are combined to provide an anaglyph image 50. The anaglyph image 50 provides image difference coded images to an observer wearing stereo glasses 40 having filters 42. Nominally the image differences are color coded and the filter 42 are color filters, such as red filter 43 and cyan filter 44, although some stereo glasses 40 have filters 42 that are polarization filters. The observer (not shown), who benefits from both mental processing and experiential expectations concerning depth perception and perspective, can then cognitively fuse and recognize a perceived 3D image 20 within their brain. It should be understood that the observer can also be viewing a printed dynamic anaglyph image 420 of the type of the present invention.

As a 3D visualization technology, anaglyphs are simple. Additionally, their size is unlimited and they are a convenient and readily available way to produce printed images that can be perceived by most people as a stereo image. The principle of anaglyphs was first illustrated using blue and red lines drawn on a black field, with observers wearing red and blue glasses to perceive the effect. In 1895, Louis Ducas du Hauron invented the anaglyph stereoscopic print (U.S. Pat. No. 544,666), in which stereoscopic photographs were reproduced as anaglyph prints on paper viewable by an observer wearing color filter glasses. This was accomplished by a process of printing the two negatives, one in blue (or green) and the other in red, on the same paper to form the stereoscopic photograph.

Although anaglyphs are readily produced, they are not without issues, which include ghosting (where a color from the left image leaks to the right eye (and vice versa)), left eye and right image avis-registration that affects image fusion, and retinal rivalry (the two images have unequal luminance, and one eye dominates or there is perceived flicker). For example, blue image ghosting can occur, resulting in a violet or purple image instead of a black and white one. As an attempt to resolve such problems, prior art U.S. Pat. No. 2,135,197 by J. A. Norling provides an approach for providing anaglyph stereoscopic prints using a blue-magenta filter pair, in which secondary yellow filtering is used to eliminate the blue image ghosting. As another example, the paper "*Choice of Inks for Printed Anaglyphs*", by W. Cox, published in Applied Optics, Vol. 16, pp. 2586 (1977), proposes using to reduce the ghosting of the green image through the green filter, by using a green fluorescent ink instead of a normal process ink that has significant red spectral response, and thus can leak red light through the green transmitting filter. The green fluorescent dye boosted the green luminance, allowing the green passband filtering to be narrowed.

As previously noted, with the early anaglyph technologies, observers viewed tinted black and white or monochrome images, though they wore red-green or red-blue pair color filter glasses. Of course, it was desirable to provide colored anaglyphic pictures. U.S. Pat. No. 4,620,770 by H. Wexler, entitled: "Multi-Colored Anaglyphs", provided one approach. In the '770 patent, an anaglyph is created using two distinctly or approximately complementary colored pictures, such as a red and blue color pair. The elements of each picture appear in outline only, with shifted outlines being rendered in one of the two chosen colors. The two colored pictures are prepared on a white, off-white or lightly colored background. Whereas, the interior portions of the elements of one of the two pictures are colored according to the whim or aesthetics of the designer.

With the common red and cyan (green+blue) filter pair, color images can be seen, however, color reproduction is compromised, as each eye is receiving only a portion of the visible color spectrum, and the color quality is poor. Although a truly full-color stereoscopic image is not considered achievable with anaglyphs, a properly constructed anaglyph using complimentary colors can approximate a full-color image. Various approaches have been developed to improve the color quality, often using color filter combinations other than typical red-cyan or red-green filter pairs.

As a particular example for enhanced color anaglyphs, the "Anachrome" approach is a variant of the red-cyan filter pair in which the left eye has a dark red filter, while the right eye has a cyan filter that leaks (~2%) some red light. This color channel pairing provides better color perception results, as the images can show red hues better than red-cyan filter pairing. This assigns two-eyed "redness cues" to objects and details, such as lip color and red clothing, that are fused in the brain. However, in the anachrome approach, care must be taken to closely overlay the red areas into near-perfect registration, or "ghosting" can occur. "Mirachrome" is another alternate red-cyan system, similar to anachrome, but with the addition of a weak positive correction lens on the red channel to compensate for the chromatic aberration of eyes. Related U.S. Pat. No. 6,561,646 by A. Silliphant provides stereo filter glasses in which one lens has an optical corrector. In contrast, the "trioscopic" approach uses green and magenta filtering instead of red-cyan filtering, to provide better color and less chromatic aberration than the anachrome approach. The ColorCode 3D approach, described in U.S. Pat. No. 6,687,003 by S. Sorensen et al., also uses an alternate color filter pair, amber and dark blue, to provide improved color rendering, although the images can be dark.

While the color appearance of an anaglyph image can be enhanced by using an alternate color coding scheme to the traditional red-cyan channel pairing, crosstalk can be differentially impacted. The paper, "*Comparing levels of crosstalk with red/cyan, blue/yellow, and green/magenta anaglyph 3D glasses*", by A. Woods et al., published in SPIE Vol. 7254, pp. 75240Q-1-12 (2010) examines this issue in detail for stereo glasses having a range of different spectral filter profiles (including gel, inkjet printed, and dichroic filters) which are used to view anaglyphs seen electronically on different electronic displays with different emission spectra (plasma, CRT, and LCD). While the results do not apply directly to printed content, it can be concluded that different color coding schemes can work either significantly better or worse for crosstalk depending on the pigment and stereo glasses filter spectra used.

It is noted that as image understanding and computational abilities have improved, it is no longer necessary to capture a stereo image pair with two cameras in order to produce anaglyph or other stereo images. Stereo images can be effectively derived from still or video images captured using a single camera. Stereo images can also be generated synthetically to create realistic views or to create stylized or surreal views for use in virtual worlds, animation, or video games. Whether anaglyphs are created from real images or synthetically, various techniques can be applied to improve 3D perception and minimize artifacts such as retinal rivalry or crosstalk. For example, U.S. Pat. No. 6,389,236 by O. Western, entitled "Anaglyph and Method", provides for improved anaglyphs with reduced retinal rivalry in which the convergences angle and parallax are optimized by a ray mapping method.

One problem with prior art anaglyphs images is that once printed, they can only be properly viewed by observers wearing the appropriate stereo glasses 40. In particular, when an anaglyph is viewed as a two dimensional (2D) image, the offset and overlapped color images contain pronounced color fringing (colored borders of objects) which is often confusing and distracting to the viewer. For example, on a 4"×6" image, the color fringes can extend for several millimeters (mm) about the edges of the image content. This problem has been addressed by altering the position, location, or color of the color encoded disparity data. For example, in a recent paper, "*A Perceptual Model for Disparity*", by P. Didyk et al., ACM Transactions on Graphics, Vol. 30(4) (Proceedings SIG- GRAPH 2011), a perceptual model of binocular disparity was provided which includes a stereo image difference metric to compare a stereo image to an alternative stereo image and to estimate the magnitude of the perceived disparity change. As an example, the disparity model is used to create "backward compatible" anaglyph images that appear as successful 2D images, but also as successful 3D images when colored glasses are worn. Starting from a pair of stereo images, disparity is compressed or flattened by removing low frequency content, which improves backward compatibility. However, at the same time, the change in the stereo image difference metric is monitored to ensure that at least a specified minimum of perceived disparity remains. Didyk et al. suggest that the loss of the low frequency image difference data causes disparity decay that is mostly invisible, while the disparity discontinuity and apparent stereo depth are effectively retained. When the resulting images are examined, the backward compatibility is largely successful, as visible artifacts are greatly reduced when the image is viewed as a 2D image without stereo glasses. However, for such methods, the perception of stereo or 3D image quality is noticeably degraded. Additionally, relative to the original anaglyph stereo image, some depth information is lost.

Alternately, in U.S. Patent Publication 20090278919, entitled "High Fidelity Printed Anaglyphs and Viewing Filters", and filed by M. Ramstad, proposes an approach for a printed anaglyph that has an acceptable image appearance for both 2D and 3D viewing. In particular, the '919 publication proposes that the anaglyph can be printed with conventional inks, as well as UV stimulated, visibly fluorescing inks. One eye's image is viewed through a first viewing filter which substantially transmits red, green and blue components of the first image and blocks the fluorescent color. The second eye's image is viewed through a second viewing filter which substantially transmits the fluorescent color and blocks the other regions of the visible spectra. However, in normal lighting, the self emissive fluorescent inks may provide the viewers with a halo effect along the edges of the printed content, rather than a 3D effect, as the fluorescing inks glows, and provides a much brighter luminance than the surrounding content printed with non-fluoreses conventional inks. The intensity of the ambient visible light illumination may have to be raised to compensate. Additionally, anaglyph image disparities are normally provided to both eyes, but the '919 publication only provides highlighting to one eye, which would limit the effectiveness of these images.

Therefore, it would be desirable to provide printed anaglyph images that have both a two dimensional viewing state and a three dimensional viewing state without incurring significant loss in either 2D or 3D image quality. In particular, it would desirable if the image fringing or disparities at the image content edges that enable the 3D view are minimally visible when the printed image is in the 2D image viewing state. Moreover, it would be desirable if such printed anaglyph images can be readily switched between the 2D and 3D image states in a repeatable and controlled manner.

SUMMARY OF THE INVENTION

In one aspect, method for providing a printed dynamic anaglyph image is provided. According to this method, left eye information and right eye information representing different perspectives of the same scene are determined and data is accessed describing color characteristics of mutable colorants that have spectral absorption characteristics that can be transitioned between a first colorant state and a second colorant state by application of an external stimulus and non-mutable colorants that cannot be transitioned between a first colorant state and a second colorant state by application of the external stimulus with the colorant type map.

The left eye information and right eye information are analyzed with an image processor to determine a difference map that defines regions of image difference between the left eye information and the right eye information and the difference map is analyzed to determine a colorant type map that selectively defines first image regions within the difference map image regions for which a specified plurality of the colorants includes at least one of the mutable colorants having spectral absorption characteristics that can be transitioned between a first colorant state and a second colorant state by application of the external stimulus and at least one of the non-mutable colorant further defines second image regions to be printed with only non-mutable colorants. A print specification for the printed dynamic anaglyph image from the colorant type map. The at least one mutable colorant and the at least one non-mutable colorant in the colorant type map are selected so that the printed dynamic anaglyph image has a first appearance state in which the at least one mutable colorant is in the first colorant state and is color matched to at least one of the left eye information and the right eye information; and the at least one mutable colorant and the at least one non-mutable colorant in the colorant type map are selected so that the printed dynamic anaglyph image has a second appearance state when the mutable colorant is in a second colorant state in which the at least one mutable colorant provides a color that spectrally overlaps a spectral filter in one eye of a pair of stereo color glasses so that three dimensional effects can be perceived.

BRIEF DESCRIPTION OF THE DRAWINGS

FIGS. 8A and 8B depict exemplary timing diagrams for stimulating mutable colorants.

FIG. 8C depicts an exemplary timing diagram for mutable colorant response to stimulus.

DETAILED DESCRIPTION OF THE INVENTION

The invention is inclusive of combinations of the embodiments described herein. References to "a particular embodiment" and the like refer to features that are present in at least one embodiment of the invention. Separate references to "an embodiment" or "particular embodiments" or the like do not necessarily refer to the same embodiment or embodiments; however, such embodiments are not mutually exclusive, unless so indicated or as are readily apparent to one of skill in the art. The use of singular or plural in referring to the "method" or "methods" and the like is not limiting. It should be noted that, unless otherwise explicitly noted or required by context, the word "or" is used in this disclosure in a non-exclusive sense.

Figure 3A:
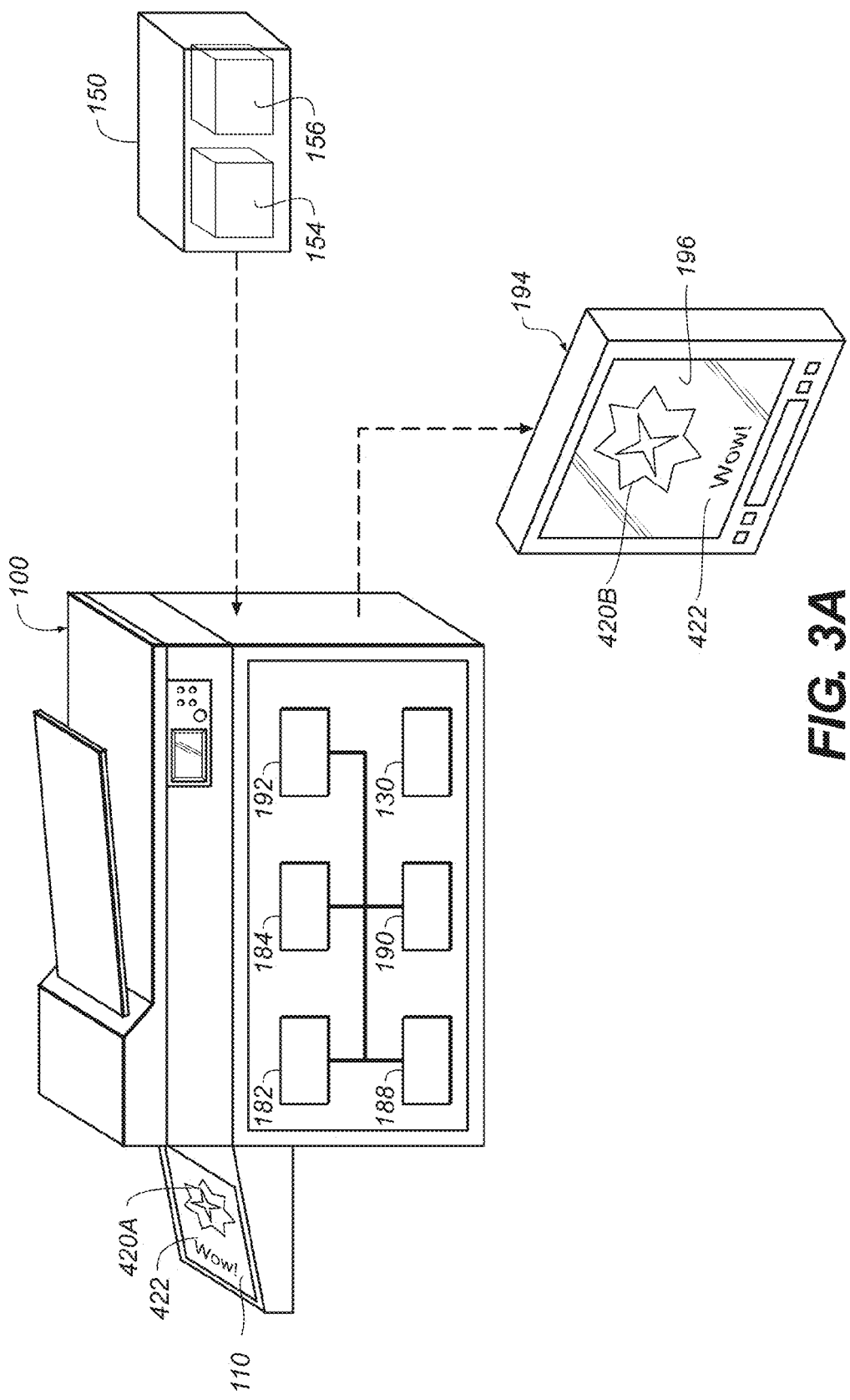
FIG. 3A depicts a printer for producing a printed anaglyph image in accordance with the present invention.

FIG. 3A shows a first embodiment of a printer 100. Printer 100 has a print engine 120 and a receiver transport system 130 that are controlled by a printer controller 182 to print image on a receiver 110. Print engine 120 has at least two printing stations 170 that can be used to individually apply a pattern of donor material such as a toner, ink, or wax, on receiver 110, where each donor material contains a colorant, so that a plurality of colorants can be applied to receiver 110. The plurality of colorants includes one or more mutable colorants having spectral characteristics that can be controllably transitioned between a first colorant state and a second colorant state. The colorants will also generally include one or more conventional generally immutable colorants such as dyes or pigments whose spectral characteristics are nominally static.

Printer controller 182 operates printer 100 based upon input signals from a user input system 184, sensors 186, a memory 188 and a communication system 190. User input system 184 can comprise any form of transducer or other device capable of receiving an input from a user and converting this input into a form that can be used by printer controller 182. Sensors 186 can include contact, proximity, electromagnetic, magnetic, or optical sensors and other sensors known in the art that can be used to detect conditions in printer 100 or in the environment-surrounding printer 100 and to convert this information into a form that can be used by printer controller 182 in governing printing, finishing or other functions.

Memory 188 can comprise any form of conventionally known memory devices including but not limited to optical, magnetic or other movable media as well as semiconductor or other forms of electronic memory. Memory 188 can contain for example and without limitation image data, print order data, printing instructions, suitable tables and control software that can be used by printer controller 182. As will be described in greater detail below, memory 188 can also have data stored therein describing color characteristics of mutable colorants that have spectral absorption characteristics that can be transitioned between a first colorant state and a second colorant state by application of an external stimulus and non-mutable colorants that cannot be transitioned between a first colorant state and a second colorant state by application of the external stimulus.

Communication system 190 can comprise any form of circuit, system or transducer that can be used to send signals to or receive signals from memory 188 or external devices 192 that are separate from or separable from direct connection with printer controller 182. External devices 192 can comprise any type of electronic system that can generate signals bearing data that may be useful to printer controller 182 in operating printer 100. In one embodiment memory 188 can be provided as a external device 192 that can be accessed by way of communication system 190.

Printer 100 further comprises an output system 194, such as a display with a display screen 196, audio signal source or tactile signal generator or any other device that can be used to provide human perceptible signals by printer controller 182 to feedback, informational or other purposes.

Printer 100 prints images based upon print order information. Print order information can include image data for printing and printing instructions from a variety of sources. In the embodiment of FIG. 3A, these sources include memory 188, communication system 190, that printer 100 can receive such image data through local generation or processing that can be executed at printer 100 using, for example, user input system 184, output system 194 and printer controller 182. Print order information can also be generated by way of user input system 184 and output system 194 and can be calculated by printer controller 182. For convenience, these sources are referred to collectively herein as source of print order information 198. It will be appreciated, that this is not limiting and that source of print order information 198 can comprise any electronic, magnetic, optical or other system known in the art of printing that can be incorporated into printer 100 or that can cooperate with printer 100 to make print order information or parts thereof available.

In the embodiment of printer 100 that is illustrated in FIG. 3A, printer 100 has a data processor 150. In this data processor 150 has an optional color separation image processor 154 to convert the image data into color separation images that can be used by printing stations 170 of print engine 122 to generate toner images. An optional half-tone processor 156 is also shown that can process the color separation images according to any half-tone screening requirements of print engine 122.

Data processor 150 processes image data as necessary to convert image data and any printing instructions into signals that can be used by printer controller 182 or print engine 120 to print. Data processor 150 can be used to process data in other ways according to printing instructions received with print order date or with user input received through user input system 184. Data processor 150 can be integrated with other components of printer 100 or data processor 150 can be separate therefrom and can in one embodiment comprise a digital front end that can be used to allow a user to edit, modify, add or control printing operations.

Figure 3B:
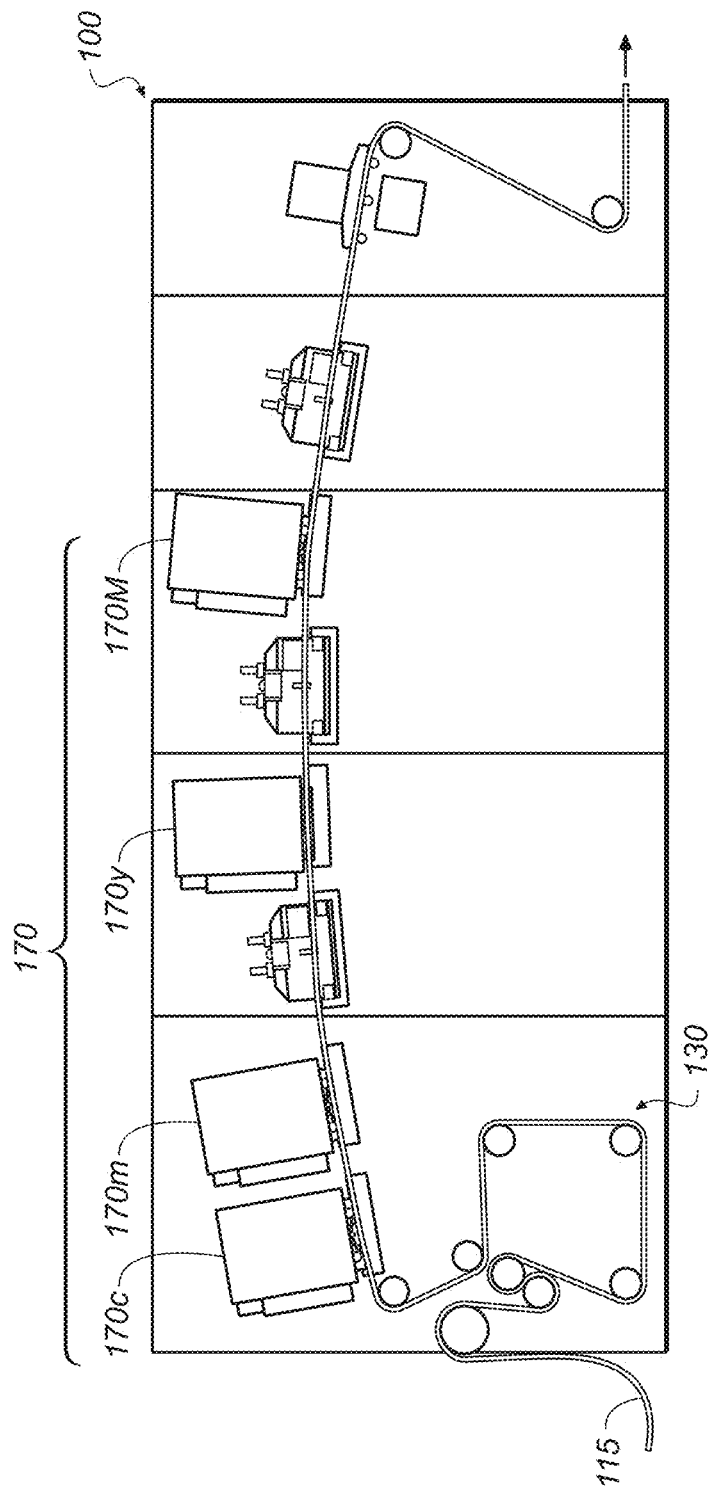
FIG. 3B depicts alternate embodiment of a printer having a high speed print engine that can be used in the system of FIG. 3A.

The printer 100 shown in FIG. 3A can be a desktop or mid-market printer, such as an inkjet or printer that uses one or more inkjet print heads (not shown) to print on the receiver 110, which can include cut sheet paper. As another example, FIG. 3B depicts an embodiment of printer 100 having a high speed print engine 160 and receiver transport system 130 that cooperate to deposit ink or another donor material on a fast moving generally continuous web of receiver 110. Although this web receiver 115, and receiver 110 or print media are generally meant to be paper, it should be understood that the method of the present invention for creating and using printed dynamic anaglyph images can print the images on any appropriate type of media or substrate, which include, but are not limited to, paper, cardboard, cloth or other textiles, plastic or polymer surfaces or substrates (transparent or opaque), glass, metal sheet, multi-layer composite materials, or variations and combinations thereof.

In the embodiment of printer 100 shown in FIG. 3B, printer 100 has four printing stations 170, although it may have more. In this example, the first three printing stations 170C, 170M, and 170Y, apply cyan, magenta, and yellow inks, respectively, and the fourth printing station 170M applies a mutable ink. Alternately, these print stations can deposit different colored inks, such as red, green, or blue inks. In some embodiments, one or more additional print stations can be added to apply additional inks such as a black ink (for example, to have a CMYK printer) or another mutable ink. Mutable ink is applied by one or more printing stations 170M, which can apply any type of mutable ink, including the thermochromic or photochromic inks that will be discussed subsequently. For maximal color change effect, it can be advantageous to apply the mutable colorants over the immutable colorants, depending on the print densities involved. Transparent sealer layers or coatings can be applied over a completed dynamic anaglyphic print.

Figure 3C:
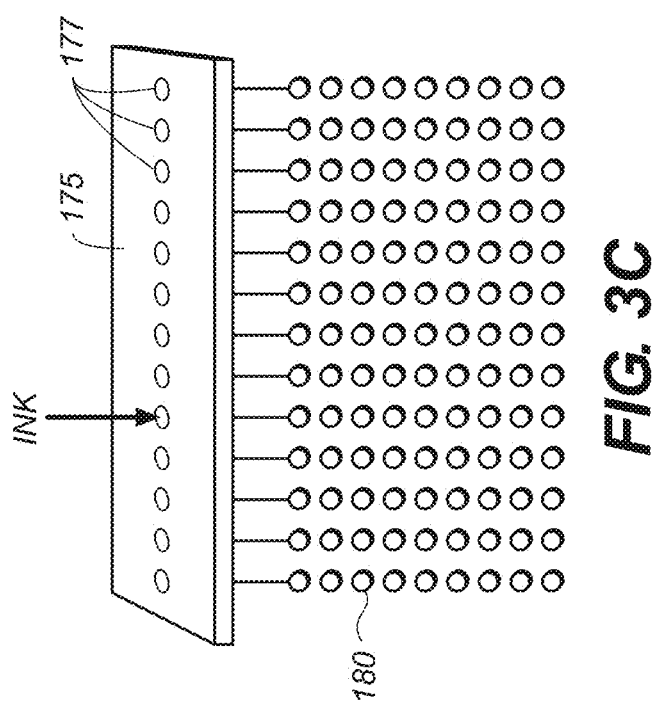
FIG. 3C depicts an ink jet print head that can be used in the printers of FIG. 3A or 3B.

FIG. 3C then shows a simplified ink jet print head 175 that can be provided within a printing station 170 for the case where the printer 100 is a continuous inkjet printer. The print head 175 includes multiple nozzles 177 arranged in an array. For continuous inkjet printers, ink flows continuously through the print head and provides streams of fluid, which break into ink droplets 180. The droplets are either allowed to fall onto the web receiver 115 (FIG. 3B), or are deflected to an ink catcher for locations where no ink should be applied to the printed page.

In other embodiments, the print head 175 can be a drop-on-demand print head which only produces drops as they are needed. In some configurations of the printer 100 in FIG. 3B, some of the printing stations 170 can use continuous-type inkjet print heads 175, while other print stations can use drop-on-demand print heads 175. For example, printing stations 170C, 170M and 170Y can use continuous-type inkjet print heads, while the printing stations 170M can use a plurality of drop-on-demand print heads, such as, for example, one or more for each type of mutable ink to be applied. In embodiments where mutable inks are used that have viscosities that are higher than those of many normal (non-mutable) process inks, the print heads 175 for printing station 170M are more likely to have ink ejector mechanisms, such as ones having piezo actuators, to provide the greater force necessary to emit such inks. However, it should be understood that multiple kinds of inks, including both normal and mutable (reversible or irreversible) inks, can also be emitted by the same nozzle, or printed with the same applicator, either simultaneously as mixtures or sequentially. It should also be understood that while FIG. 3C specifically illustrates the use of ink jet printing technology; other technologies can also be used to apply the mutable inks for the purposes of the present invention. For example, printer 100 can use a variety of printing technologies including but not limited to inkjet, electro-photographic, offset litho, dry offset, letterpress, gravure, flexography, or screen printing to apply inks or dry inks such as toners to a receiver. Similarly, it will be appreciated that printer 100 can use electrophotographic and other forms of toner printing, phase change toner printing, and wax printing. Thermal transfer printing can be used as can any other form of printing that can form patterns non-mutable colorant of at least one mutable and can be used in like fashion.

Figure 4:
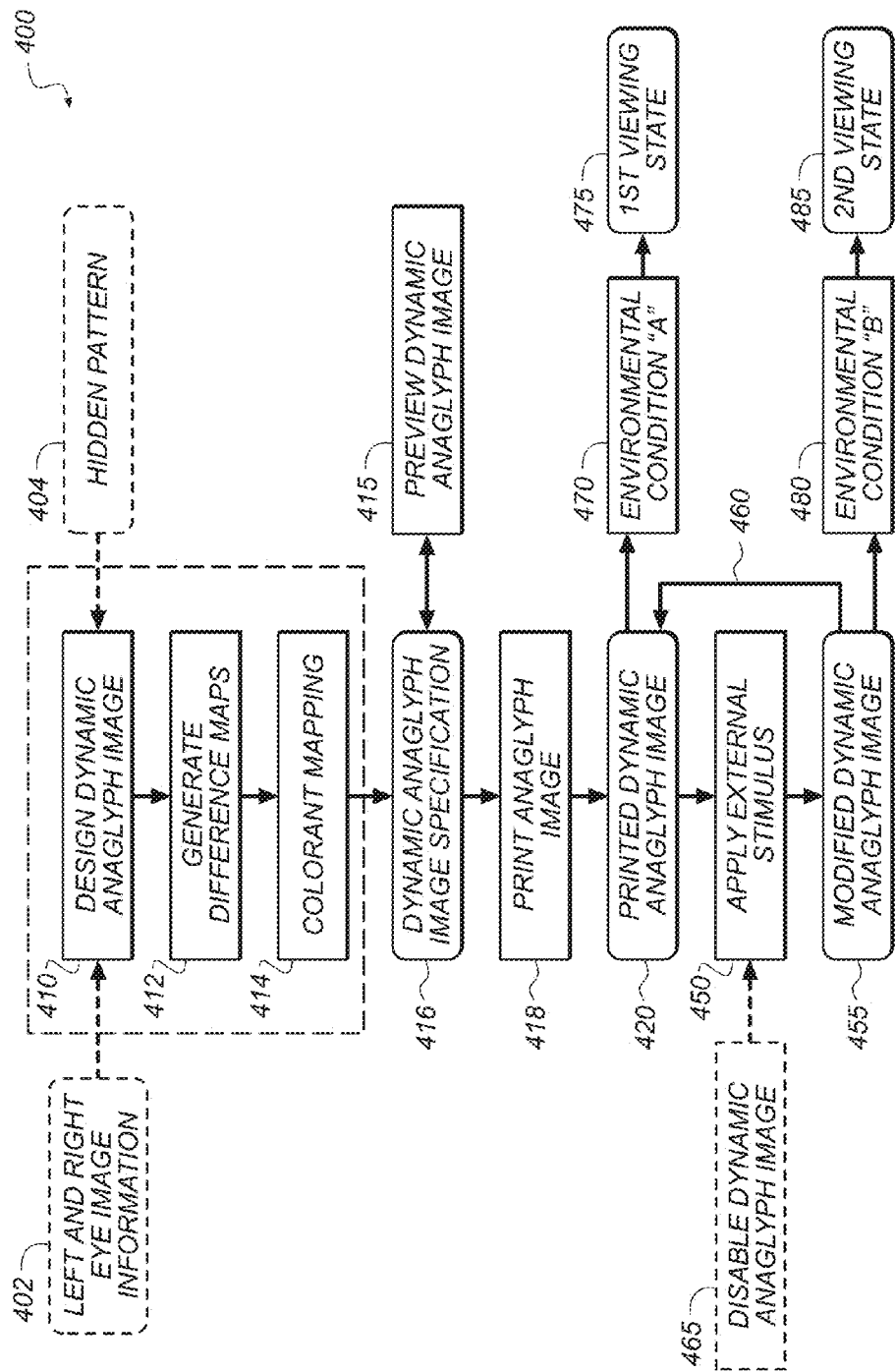
FIG. 4 is a flowchart illustrating a method for providing a printed dynamic anaglyph image.

FIG. 4 shows a flowchart depicting one embodiment of a dynamic anaglyph method 400 for forming a printable dynamic anaglyph image 420 that can be executed for example by a data processor 150 of the type that can be used with a printer 100. This method can be automated, human guided, or a combination thereof.

In a first step shown in FIG. 4, left and right perspective image data is determined (step 402). There are a variety of ways in which such data can be determined. In a first embodiment, the source (e.g. memory 188) of print order data can receive print order data including left eye image data and right eye image data. In other embodiments the print order data can include data from which data processor 150 can determine a left image data representing a left perspective image of a scene and right perspective image data representing a right perspective of a scene. In other embodiments, the print order data can provide information from which data processor and/or printer controller 182 can obtain the left and right perspective image data from an external source using for example communication system 190. In still other embodiments the source of print order data can provide data, algorithms, and other information that can be used to generate either the left perspective image, or the right perspective image. Additionally, in some instances either the left eye image data or the right eye image data can take the form of difference information representing a difference between a provided left eye image and the right eye image or between a provided right eye image and the left perspective image. In still other embodiments, a single perspective image can be coupled with synthetic perspective image data intended to provide the appearance of a second perspective image. Such synthetic perspective image information, can, in turn be manually entered by way of user input system 184 or can be automatically calculated using known algorithms as desired. In other embodiments, a left eye image data and right eye data image data either derived from a single original static 2D image or from a paired set of static 2D images that represent left eye and right eye source images and that are obtained or generated in any other known manner.

Considering again FIG. 4, the left eye and right eye image data is then used to design a dynamic anaglyph image (step 410). From the design dynamic anaglyph image step 410, there follows a generate difference map step 412 in which the difference maps of image disparities are determined. One embodiment of this process will now be described with reference to FIGS. 5A-5C which describes the application of this process in determining image disparities in a pair of images 560 and 565 of a real scene of people walking in a busy shopping mall.

Figure 5B:
FIGS. 5A and 5B depict the left eye and right eye images for a stereo pair from an actual scene
Figure 5A:
Figure 5D:
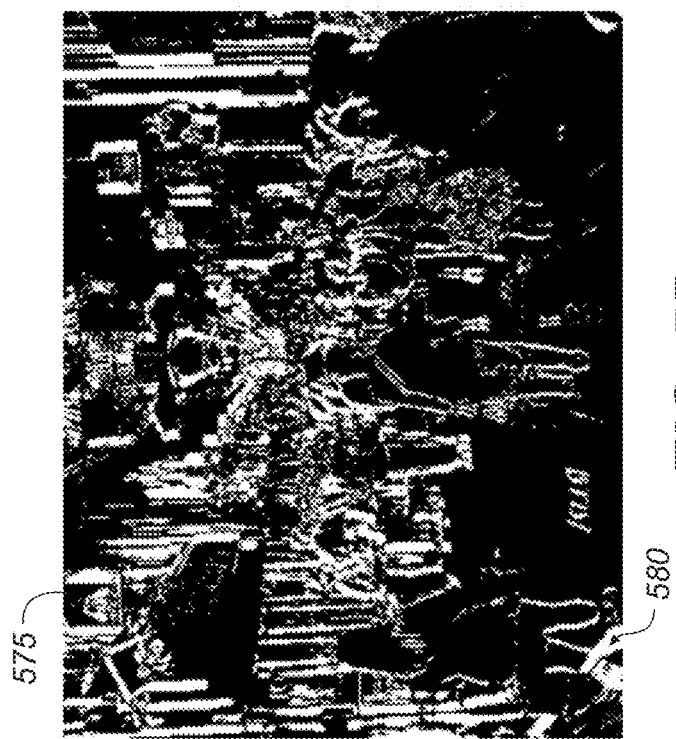
FIG. 5D depicts a thresholded image disparity image map related to the image of FIG. 5C.
Figure 5C:
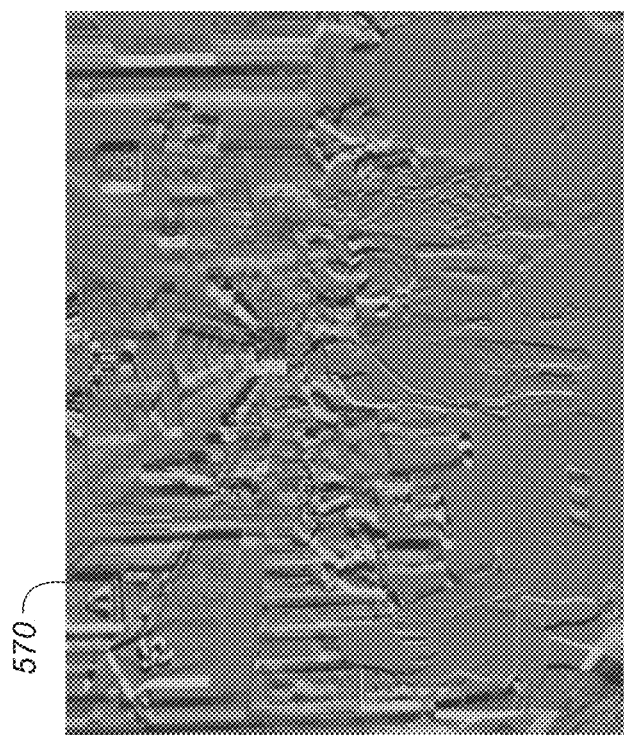
FIG. 5C depicts an image disparity image based upon FIG. 4A.
Figure 5F:
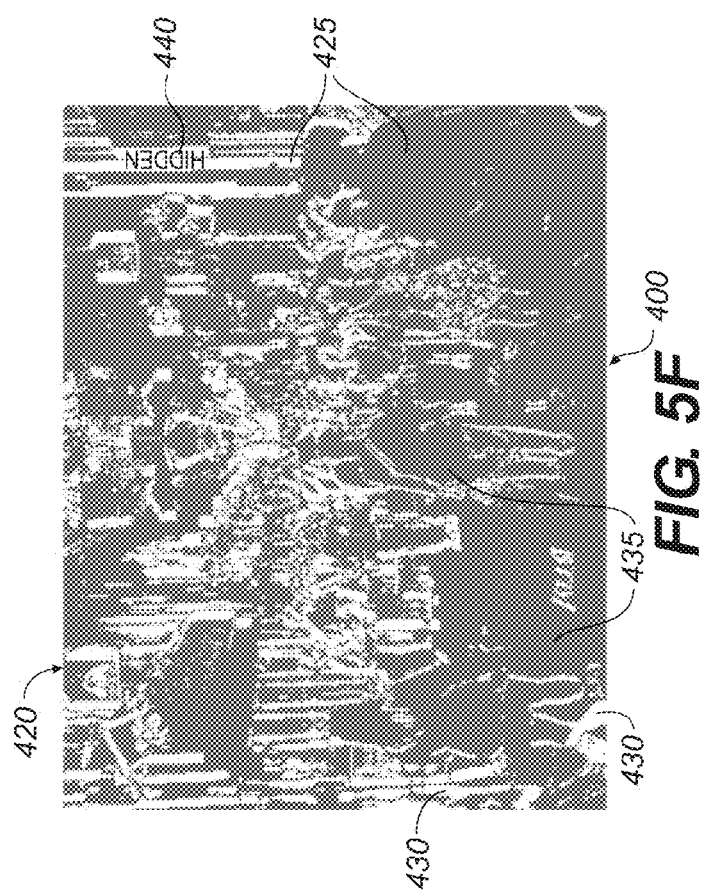
FIG. 5F depicts a dynamic printed anaglyph image in accordance with the present invention which is exemplified using the anaglyph image of FIG. 5E and the thresholded image disparity image map of FIG. 5D.
Figure 5E:
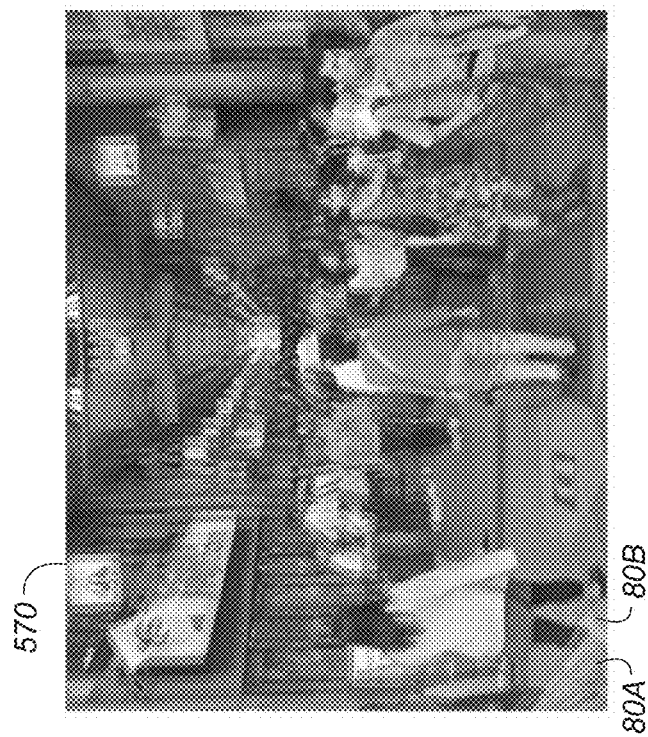
FIG. 5E depicts an anaglyph image assembled from the left eye and right eye images of FIGS. 5A and 5B.

FIG. 5A and FIG. 5B depict left and right source images 560 and 565 respectively, used to create the anaglyph image 550 shown in FIG. 5E. FIG. 5C depicts a difference map 570 generated by the generate difference map step 412 which can be made using source images left and right 560 and 565 or anaglyph image 550. That is, difference maps 570 can be generated by a few different calculative methods that have similar, but different interpretations. For example, difference map 570 can represent the graphic differences or code values $[R_L-R_R, 0, 0]$ between the anaglyph image 550 and right source image 565 assuming that red channel of the left source image 560 will be used to provide the static image elements for the anaglyph image to be formed. In an alternative embodiment, difference map 570 can indicate the magnitude of pixel value differences between the anaglyph image 550 and left source image 560 in code values $[0, G_R-G_L, B_R-B_L]$ at the corresponding pixel positions assuming that the green and blue channels of the right source image 565 will be used to provide the static image elements for the anaglyphic image to be formed. Alternatively, the difference map 570 can indicate the magnitude of pixel value differences between the right source image 565 and the left source image 560 in code values $[R_R-R_L, G_R-G_L, B_R-B_L]$ at corresponding pixel positions. While the image difference maps 570 generated by each of these methods are not identical, they are correlated, and can equivalently be used in designing a printed dynamic anaglyph image 420.

FIG. 5D depicts a thresholded difference map 575 in which the difference map 570 (or disparity map) of FIG. 5C has been analyzed to reveal both thresholded image difference regions 580 with both large and small image differences between the anaglyph image and the right view image. In particular, the black regions of FIG. 5D are image areas where the image differences are below a difference threshold T such that they are statistically or perceptually identical. Whereas, the white regions of the thresholded difference map 575 are image locations where there are large image differences (580) between right source image 565 and left source image 560 that are of large magnitude as measured by being above a threshold T. As an example, for a case where the original images (i.e. the right view image, the left view image, and the anaglyph image) are represented as 8-bit sRGB images, the threshold T can be 20 code values. This difference is computed by comparing the code values of corresponding locations over all color channels of the pair of images being compared. This exemplary shopping mall scene is a fairly busy image with a deep 3D perspective, and in the threshold difference map 575 of FIG. 5D, about 20% of the image area correspond to image difference regions 580 that have significant differences between the anaglyph image 550 and right source image 565 and is shown as white image area. In a more typical stereo image pair or anaglyph, the image regions or locations corresponding to the large anaglyphic image difference regions 580 occupy only 5-10% of the image area. These image regions are important for conveying 3D information for proper depth perception in the anaglyph image. By comparison, for color coded line drawings, like that suggested in FIG. 1C, the percentage area having large image differences can be even smaller, but such images can still be effective anaglyphic images.

Figure 1A:
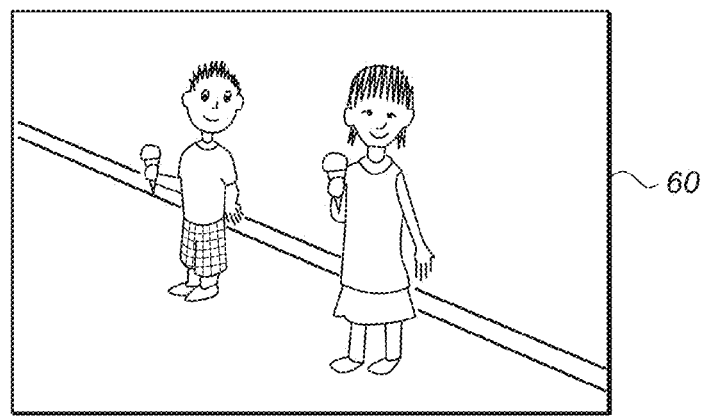
FIGS. 1A and 1B depict a stylized pair of left eye and right eye stereo images.
Figure 1B:
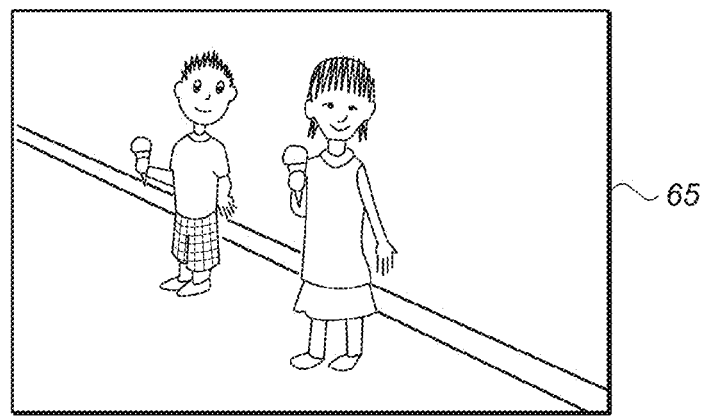
Figure 1C:
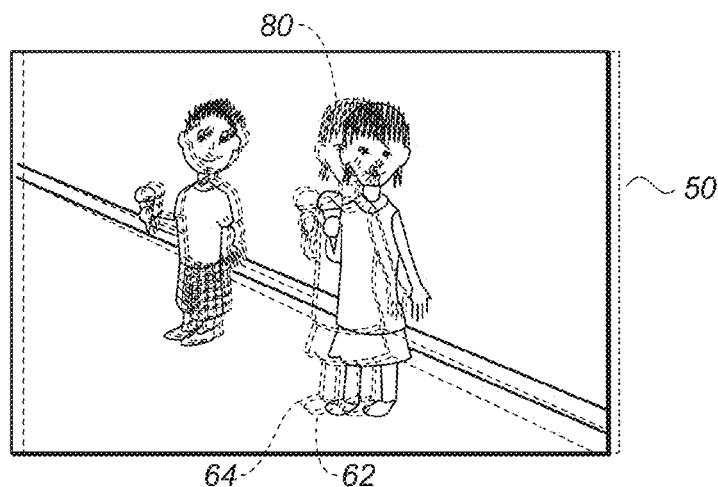
FIG. 1C depicts an anaglyph image assembled from the left eye and right eye images of FIGS. 1A and 1B.

In the case of the FIG. 1C line drawings, the image content or the green and blue image channels 64 can appear as ghosting anaglyph image element 80 relative to the image content red image channel 62 for an observer viewing anaglyph image 50 without stereo glasses 40. The same effect occurs for more complicated images. For example, FIG. 5E illustrates a desired anaglyph image 550 that can be made using the difference map and the typical red-cyan color coding strategy where the anaglyph image has channels $[R_L, G_R, B_R]$. However, as is shown in FIG. 5E in grey scale, the color variations that enable the anaglyphic effect when viewed through filtered glasses create anaglyphic artifacts 80 in the image that appear as ghost or shadow image content are evident throughout the anaglyph image 550 to an observer who observes anaglyph image 550 without wearing filtered stereo glasses 40. As an example, in the left bottom corner of the image 550 there is an anaglyph image element 80A corresponding to the shirt sleeve of a pedestrian, and adjacent to it, there is an anaglyph image element 80B that appears as a ghost feature.

It will be appreciated that while anaglyph image 550 has highly visible anaglyphic image elements creating a stereoscopic effect when viewed using filtered glasses, what is desired is that this image can be printed in a manner that allows the anaglyph image 550 to have become a printed dynamic anaglyph image 420 with a second state wherein the printed form of anaglyph image 550 has an appearance where 2D image information (i.e. visual information that can be observed without the aid of filtering glasses) substantially substitutes for the image information forming the anaglyphic artifacts.

In the embodiment dynamic anaglyph method 400 that is illustrated in FIG. 4, a color mapping process (step 414) is used to specify donor materials based on an image difference map 570 created in the generate difference map step 412. The colorant mapping process 414 produces a dynamic anaglyph image specification 416 for use in printing printed dynamic anaglyph image 420 so that anaglyph print can be changed from a first state where the anaglyphic artifacts 80 are not visible (for 2D viewing) as the mutable colorants, printed in the mutable portions 430 that generally correspond to the image difference regions 580, change state such that the content of the image difference regions 580 and the anaglyphic artifacts 80 can be readily seen and used for anaglyphic purposes (3D viewing). Donor materials having conventional non-mutable colorants can be used in image regions that are constant for the 2D and 3D viewing states where there are not anaglyphic image elements, and also in the mutable image regions identified by image differencing (step 412) that generally correspond to the anaglyph image regions 580 where there are anaglyphic image elements 80. Whereas, for the anaglyphic image elements in the image difference regions 580 identified by image differencing (step 412) that generally correspond to image difference regions 580 mutable colorants will be identified and selectively specified to produce printed dynamic anaglyph image 420. In particular, these anaglyphic forming image elements are formed using donor materials having a mutable colorant whose spectral absorption properties change in response to an applied stimulus or environmental condition. As the spectral absorption changes, so does the spectral reflectance or spectral transmittance, thereby altering the reflected or transmitted spectra and coloration of transiting visible light.

It will be appreciated in a typical anaglyph image 50, only a small fraction (5-20%) of the anaglyphic image area has significant image difference between the left and right source images. Therefore, it is also possible to selectively print an anaglyph image with donor materials having mutable colorants that can respond to an external stimulus to enable switching between a 2D image viewing state and a 3D or stereo image viewing state, without wholesale use of donor material having such colorants. The level of threshold T can be set at a minimum level that will eliminate small image disparities identified in the image difference regions 580 that are perceptual difficult to recognize, while differences >T will be rendered for anaglyphic viewing. For example, threshold T can be set at $T_1 < 0.5-1$ JND (just noticeable difference). Threshold T can also be set at a level $T_2$ to moderate the use (volume or density and area) of the mutable colorants, which are typically much more expensive than are the normal or immutable colorants. If that level $T_2 > T_1$, then some image disparity or rendering of anaglyphic 3D effect may be sacrificed to moderate mutable ink usage. Alternately, in the intermediate zone between thresholds $\Delta T = T_2 - T_1$, some image disparity information in the image difference regions 580 can be selectively printed with reduced amounts of mutable colorants (compared to the nominal specified amount). In this intermediate zone, non-mutable colorants can also be selectively printed, where the benefit for 3D viewing outweighs the presence of a visible 2D viewable artifact.

As an example, FIG. 5F depicts an altered version of the thresholded difference map 575 of FIG. 5D illustrating aspects of the concept of a printed dynamic anaglyph image 420. As shown, the printed dynamic anaglyph image 420 includes a variety of image regions 425, including both regions that are mutable portions 430 that are printed at least with mutable inks or colorants and regions that are immutable portions 435 that are printed with normal process inks or colorants that nominally retain their coloration even in various environments. In this example, the mutable portions 430 generally correspond to the large anaglyphic image difference regions 580 shown in the exemplary threshold difference map 575 of FIG. 5D. These mutable portions 430 can be identified by applying a spatial filter (e.g. a morphological erode or close filter) to the thresholded difference map 575.

In some embodiments a hidden pattern 440 can be provided for inclusion in a printed dynamic anaglyph image 420. The hidden pattern 440 can be a human readable pattern, including text, or a machine readable pattern that is visible in at least one of the appearance states, including an intermediate state associated with intermediate colorant states. Changes between appearance states can also cause changes in the appearance of hidden text or codes within or adjacent to the anaglyph portion of the printed dynamic anaglyph image 420, with or without causing changes in the perceptual impact of the anaglyph image. Accordingly, the dynamic anaglyph method 400 of FIG. 4 can include an optional hidden pattern design step 404 in which any hidden patterns 440 are specified, print locations within or near the image determined, and the associated use of mutable and immutable colorants defined. Then during the design dynamic anaglyph image step 410, the expected appearances of the printed dynamic anaglyph image 420, including any hidden patterns 440, for two or more appearance states, can be previewed using output system 194.

During the step of the colorant mapping process 414, a colorant type map 590 is determined which specifies the selection of mutable and immutable colorants within at least the image disparity areas. As part of step 414, image quality attributes, including color matching, color gamut, color accuracy, the presence of intermediate colors, resolution, metamerism, and image contrast are validated for all designed image appearance states, as appropriate.

The colorant mapping step can be performed by, for example, a data processor 150 of FIG. 3A. In such an embodiment, data processor receives image data specifying the image content for the printed dynamic anaglyph image 420. This mutable anaglyph image is designed to provide the image content including one or more mutable portions that will have the intended appearance for the different viewing states (2D or 3D) associated with the different colorant states of the one or more mutable colorants. Data processor 150 determines printer image data specifying the amounts of the various colorants as a function of position that is then to produce the printed dynamic anaglyph image 420A. The printer image data is designed to provide the desired image content producing the intended viewing state effects, while achieving appropriate image quality attributes, including color matching, color gamut, color accuracy, the presence of intermediate colors, control of illuminant metameric failure, resolution, or contrast, and reduction of color channel crosstalk. The image quality attributes can be described by various parameters, including color space coordinates and just noticeable differences (JNDs). Preferentially, the mutable colorants used in printed dynamic anaglyph images can be controlled using the appropriate external stimulus to provide the desired viewing states when the mutable inks are at or near endpoint color states (e.g., first colorant state 350 and second colorant state 355 in FIG. 6A).

As exemplified in the dynamic anaglyph method 400 of FIG. 4, completion of the design dynamic anaglyph image step 410, including the generate difference map step 412 and colorant mapping process 414, yields a dynamic anaglyph image specification 416, which is then used in a print anaglyph image step 418, to print the dynamic anaglyph image 420 on a printer 100 and thus provide a printed anaglyph image. During an optional preview dynamic anaglyph image step 415, a dynamic preview anaglyph image 420B can be viewed on a display screen 196 or test prints of the image (420) can be created and viewed. The printed anaglyph image is printed according to the determined print specification 416 using a plurality of colorants, including at least one appearance mutable colorant having spectral characteristics can be controllably transitioned between a first colorant state and a second colorant state by application of an appropriate external stimulus. The specified appearance states of the mutable portions of the printed dynamic anaglyph image 420 are achieved by appropriate selection of donor materials to provide mutable colorants as necessary to form mutable portion colorant levels for the plurality of mutable colorants, as well as any immutable colorants. Print specification 416 specifies the colorant levels as a function of position for the mutable and immutable colorants, which can be optimized according to the spectral characteristics and other properties of the mutable and immutable colorants and any other relevant characteristics of the donor material used in a printer 100 to produce the printed dynamic anaglyph image 420. The colorant levels can be determined via look-up tables, algorithms or other means to provide an appropriate print specification that will provide the desired appearance states for the printed dynamic anaglyph image 420. Alternately, the printing device can receive the dynamic anaglyph image specification 416 and can apply corrections, via look up tables, algorithms, or other means, to determine the colorant levels. In either case, the goal is to achieve appropriate image quality attributes, including color matches, color gamut, color accuracy, the presence of intermediate colors, metamerism, resolution, or contrast for the printed anaglyph image 420 in activated and inactivated states.

The resulting printed dynamic anaglyph image 420 has a first appearance state, represented by environmental condition A 470 (e.g. warm temperature, UV light not applied), for which there is a first viewing state 475. For example, in the first viewing state 475 the image can appear similar to the right source image 65, and be appropriate for 2D viewing. The method depicted in FIG. 4 further provides an apply external stimulus step 450 that is used to apply an appropriate external stimulus, such as light or heat, to the printed dynamic anaglyph image 420 to cause the printed dynamic anaglyph image 420 to transform into modified dynamic anaglyph image 455 which has a different appearance or viewing state, for example, when anaglyph forming elements that provide 3D content or anaglyphic artifacts 80 are more visible. For example, under a second appearance state, represented by environmental condition B 480 (e.g. cool temperature, UV light applied), the printed dynamic image 420 appears in a second viewing state 485 which can be similar to the anaglyph image 50 and is appropriate for 3D viewing when the observer 30 wears appropriate eyewear (stereo glasses 40).

If the mutable colorants are reversible, a secondary stimulus step 460 can then occur, which nominally restores the modified dynamic anaglyph image 455 to the prior appearance state of the printed dynamic anaglyph image 420, corresponding to environmental condition A 470 and first viewing state 475. In the case that the mutable inks or colorants are modulatable, a second apply external stimulus step 450 can be applied to cause a change colorant state, followed by a second secondary stimulus step 460. For example, if heating caused colorant state changes such that the printed dynamic anaglyph image 420 experienced an appearance state change from a 2D viewable image condition to an appearance state for a 3D viewable image condition, then a secondary stimulus step 460 of cooling can cause colorant states and appearance states to change back. This exemplary secondary stimulus step 460 can be active (forced cooling) or passive (returning to ambient or room temperature conditions). Likewise, reversible dye color fade, such as experienced by photochromic dyes, can be considered as a change in response to the external stimulus of time passing.

In some embodiments, a human observer 30 is able to activate the change in environmental conditions by applying the appropriate stimulus with an appropriate dosage (e.g. by activating a switch or control to change the temperature or light upon the printed dynamic anaglyph image 420) to switch between 2D and 3D viewing. In other embodiments, the external stimulus step 450 of FIG. 4 can be applied repeatedly to modify the appearance states of the printed dynamic anaglyph image 420 a plurality of times. Additionally, the change in the environmental conditions can occur on an automatic schedule (either at fixed or random intervals), for example as determined by the operation of a controller (not shown). These stimuli can trigger a variety of appearance states that include at least a 2D image state, a 3D image state, and potentially intermediate image states and states that reveal hidden patterns 440. In some embodiments, an optional disable anaglyph image step 465 can be applied, for example using an appropriate UV radiation dosage or a heat or chemical treatment, to prevent further modulation of the printed dynamic anaglyph image 420 between appearance states.

A dynamic printed anaglyph image 420 having one or more mutable portions that can be altered to dynamically change the appearance or presence of the stereo image, can be provided to the printer 100 as a printed dynamic anaglyph image 420A or to the display screen 196 as dynamic preview anaglyph image 420B (see FIG. 3A). The dynamic anaglyph images 420A or 420B can be accompanied by adjacent image content 422 that may or may not be mutable. This system can include other components such as processor-accessible memory, communications controllers, input/output devices, and other hardware not shown.

Subsequently, when the mutable inks or colorants that are printed in the mutable portions 430 are in a first appearance state, the printed dynamic anaglyph image 420 can be viewed as a 2D image. Specifically, in one appearance state, the mutable portions 430 of the printed dynamic image 420 appear similar to the right source image 65, and in a second appearance state, the mutable portions of the printed dynamic image appear similar to the anaglyph image 50. For example, in an additive color approach, the larger image difference regions 580 having mutable portions 430 or anaglyphic artifacts 84 would have mutable inks or colorants that would be colorless or nearly so in the first appearance state, and a normal 2D image would be viewable, while the mutable colors that are color coded with 3D content for 3D viewing are not visible. However, when the mutable inks or colorants are in a second appearance state such that the 3D anaglyphic artifacts 84 appear as distracting "ghost images" for 2D viewing, the printed dynamic anaglyph image 420 can be viewed as a 3D image by an observer 30 wearing the appropriate stereo glasses 40. Depending on the mutable ink or colorants used and the color design of the printed dynamic anaglyph image 420, either the unactivated or activated mutable inks states can correspond to the 2D or 3D image. However, when the mutable colorants are in a colorless or nearly colorless colorant state for the 2D image, then the mutable portions 430 must provide a color match and luminance or contrast match with adjacent immutable image portions 435 for the 2D image to be successfully viewable with minimal image artifacts (see FIG. 5G). Likewise, the requirements for successful color matching and luminance or contrast matching also apply for the case that the mutable colorants are in a colored state for the 3D image viewing state. In many cases, it may be preferable to have the unactivated or native state image provide a 2D view, and then have the colorants stimulated to provide the activated 3D image, for which an observer will then have to wear stereo glasses 40 to properly see. The 2D image can correspond to either the left eye or right eye image, though typically the right source image 65 is used.

As will be subsequently described in detail, a variety of mutable inks or colorants, including those that respond to light or heat stimulus, can be used for this purpose. The application of the appropriate stimulus causes the mutable inks or colorants to change from a first colorant state to a second colorant state, and the printed dynamic anaglyph image 420 to correspondingly change from a first appearance state to a second appearance state, such as from 2D to 3D viewable. Some of these inks or colorants are reversible, and can enable a printed dynamic anaglyph image 420 to be transitioned between 2D and 3D viewing states multiple times. Others are irreversible, and a change can only occur once. It should be understood that the mutable portions 430 that are printed with mutable or colorants generally correspond to the image areas with large image differences 80, but can extend beyond that, to include image areas with smaller image differences.

When the preview anaglyph image 420B is presented on output system 194, the mutable image portions can be readily switched between the 2D and 3D views of the potential printed dynamic anaglyph image to determine whether the mutable portions have been adjusted appropriately. Alternately, the mutable portions of the image can be adjusted in real time by altering the content of memory 188 used to store the image data for the preview anaglyph image 420B. The display screen 196 can be used to preview the appearance of the preview anaglyph image 420B during the process of designing and optimizing the anaglyph stereo effect (step 415), and for example, to compare mutable anaglyphic image to the original left eye image, right eye image, or nominal anaglyph image, to determine if the desired transformation and perceptual effects are being achieved. Preferably, the preview anaglyph image 420B is designed to simulate the appearance of a dynamic printed anaglyph image 420 that will be produced by the printer 100, accounting for the spectral characteristics of the mutable and immutable colorants available in the printer. If it is determined that adjustments are appropriate, then the prior steps (410, 412, and 414) of dynamic anaglyph method 400 can be revisited. For example, the choices for the threshold T or the choices for mutable colorants or their coverage characteristics can be changed to provide a better result. It is noted that a second display (not shown) can be used during the image design and preview stage, which may use other 3D display technologies, such as lenticular or parallax barrier, to comparatively display the original stereo image, a stereo image equivalent to the nominal anaglyph image, or a stereo image equivalent to mutable anaglyph image as a dynamic printed anaglyph image 420 seen in the 3D viewing state. Although the display spectra and the ink or pigment spectra, and likewise the stereo glasses spectra may not match, when comparing preview to print view, color management software can be used to control and anticipate images across these different platforms.

In the case of printed content, most colorants such as inks, toners, pigments, dyes, or other materials that can be printed onto the receiver 110 to provide informational or image content are not mutable once they have been deposited and cured or dried. Normal colorants have static spectral characteristics, aside from being subject to degradation, such as fade due to UV exposure, or other abuse (such as smearing). Thus, it is particularly difficult to dynamically change printed content with conventional colorants.

Examples of Printable Mutable Colorants

As is noted above the printable donor material having mutable colorant properties can take any number of forms. For the purpose of simplifying the following discussion, only thermochromic and photochromic colorant examples will be described in detail. Such colorants or dyes can be delivered in various forms, including as inks. However it will be understood that the term "ink", for the purposes of the present invention, is a liquid or paste used especially for writing or printing, which includes a colorant (typically pigment or dye), a solvent, a vehicle and additives, as appropriate. In particular, mutable color inks are often micro-encapsulated with a mutable color former (dye), a color developer within the microcapsules, and binders between them. Other types of mutable inks or mutable colorants can also be used in accordance with the present invention, such as mutable toners for use in electrophotographic printing systems or printable phase change materials and waxes.

There are certain classes of mutable colorants that can be printed, and then controllably stimulated to induce changes in their spectral characteristics. Mutable colorants are chromogenic materials, which are materials that change their color upon application of an appropriate stimulus. Types of mutable colorants include thermochromic colorants, photochromic colorants, and electrochromic colorants. Such colorants can be controllably transitioned between a first colorant state and a second colorant state by application of an appropriate external stimulus. Thermochromic colorants have spectral characteristics that can be controllably switch by a thermal stimulus. Photochromic colorants have spectral characteristics that can be controllably switch by an optical radiation stimulus. Likewise, electrochromic colorants can reversibly change between coloration states and transparency (changed spectral characteristics) when subjected to an electrical stimulus such as an applied voltage. However, thermochromic and photochromic colorants have the advantage that they enable a dynamic response without requiring the presence of proximate, imbedded, or printed electronics. There are a wide variety of thermochromic and photochromic colorants that are commercially available, including both reversible colorants that can be cycled back and forth between the different colorant states, and irreversible colorants that can only undergo a single state change (e.g., from clear to colored). These types of inks are used for a variety of purposes, including to provide obvious (such as on a cold beer bottle) or subtle color changes (e.g., for document authentication), and to obscure hidden messages, as in the thermochromic ink based camouflage example provided in U.S. Pat. No. 6,139,779 by L. Small et al. However, dynamic 2D or 3D viewable printed anaglyphs using mutable colorant pigments have not been previously proposed. It is noted that other forms of mutable colorants, such as photoluminous (glow-in-the dark) colorants, piezochromic (pressure sensitive) colorants, electro-chromic colorants, hydrochromic (moisture sensitive) colorants, or halochromic (pH sensitive) colorants, can also be used for various embodiments. In some applications, the mutable colorants can be mixed with or over-coated with other colorants or protective materials. Aside from the practicality of the activating stimulus, the mutable colorants or pigments should be chosen to match well with the stereo glass filters, such as the cyan-red filters shown in FIGS. 2B and 2C, or the filters used in other anaglyphic color coding schemes.

Thermochromic inks that can be used for mutable colorants in various embodiments of the present invention are commercially available from many companies, including Chromatic Technologies International of Colorado Springs, Colo., LCR Hallcrest of Glenview, Ill., and Printcolor Screen Ltd. of Berikon, Switzerland. Typically, thermochromic inks have a first colorant state producing a first visible color at a nominal temperature level. Then when the thermochromic inks are heated (or cooled) by application of an appropriate thermal stimulus their spectral characteristics change to a second colorant state producing a second visible color. In some cases, one of the colorant states may be a clear (i.e., invisible) colorant state where only a minimal amount of the incident light is absorbed by the colorant. Some common types of thermochromic dyes are based on mixtures of leuco dyes with suitable other chemicals that display a color change (usually between the colorless leuco form and the colored form) in dependence on temperature.

As an example, LCR Hallcrest offers a range of mixed temperature thermochromic inks that respond under different temperature conditions. These include cold activated thermochromic inks which undergo a color change when cooled (progress from clear to colored at or below 15° C.), thermochromic inks that change color at body temperatures (progress from colored to clear at 31° C.), and thermochromic inks that change color in response to high temperatures (progress from colored to clear at 47° C.).

Photochromic inks are also available from several companies, including Chromatic Technologies International and LCR Hallcrest. Typically photochromic inks are invisible (clear or colorless) or lightly colored (nearly colorless or pale) until illuminated with light (typically UV or short wavelength blue), and then become fully colored colors which are much more saturated colors, including pastel or fully saturated colors, once stimulated with the appropriate light dosage (intensity, wavelength or spectrum, and time).

Photochromic and thermochromic color changes are distinct from fluorescence induced color changes, as they are not emissive and the color changes do not require a continuous stimulus, but are metastable and can linger over extended periods of time (e.g., minutes or hours). Response times vary, but the activation color change can occur quickly, within seconds or less, although activation times of ~60 seconds is more common. As an extreme example, some photochromic dyes have been experimentally used as optical switches with switching times of ~1 μs. As another example, some LCR Hallcrest photochromic inks become saturated colors that are intensely saturated after only 15 seconds exposure to direct sunshine and then return to a clear (transparent) state after about 5 minutes indoors. The color fade rates for photochromic pigments are also quite variable. For example, Reversacol photochromic dyes, from Vivimed Labs of Hyberbad, India, are available with both fast fade rates of <30 seconds (e.g., Oxford Blue and Plum) and prolonged fade rates of 2-3 minutes (e.g. Lilac and Berry Red) or even in excess of 5 minutes (e.g., Solar Yellow and Graphite). The prolonged or metastable color states can be particularly advantageous for the present invention, because typically humans perceive anaglyph images more slowly than they do normal image content. Additionally, for many applications, such as smart packaging, the temporal pattern of an occasional stimulus and a prolonged response can be advantageous. The ink lifetime can be limited because of the degradation from solar UV exposure, but UV protected inks are known.

While thermochromic and photochromic inks often produce pastel or low saturation colors, the product families still span a range of hues, as for example, thermochromic inks can change from colorless, or near colorless states, to fully colored colors that are much more saturated. These colors include red, orange, green, blue, purple, magenta, or other colors, depending on the formulation. Photochromic inks can undergo similar color changes. The color gamut which can be achieved can be expanded by printing these mutable inks in combination with normal non-mutable inks. Published papers, such as "*Chromatic Properties of Thermochromic Inks*", by L. Johansson (TAGA Proceedings, 2006) and "*Thermochromic Inks—Dynamic Colour Possibilities*", by R. Kulcar et al., (Proc. CREATE Conference, pp. 202-206, 2010), provide some detail about the color changes obtained with these types of inks during screen printing experiments.

Figure 6A:
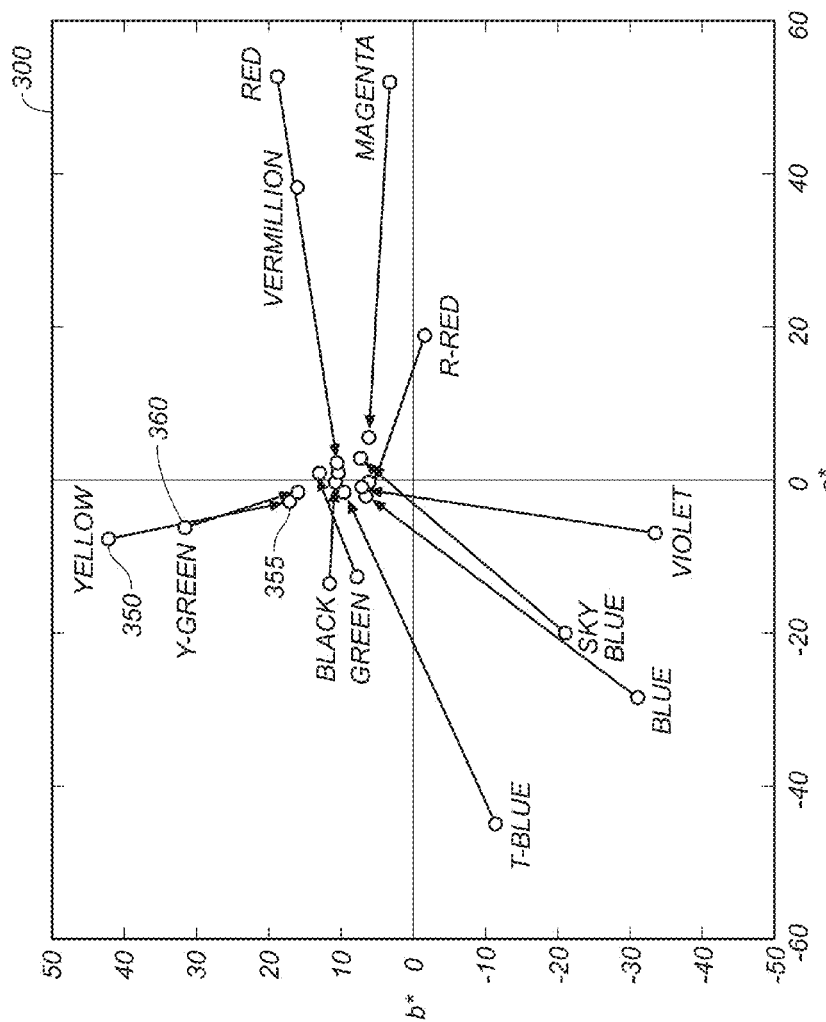
FIGS. 6A, 6B and 6C depict color changes associated with exemplary thermochromic inks.

FIG. 6A, which is taken from the Johansson paper, shows a graph 300 illustrating a range of color changes, as characterized in the well-known CIELAB color space, that are achieved by thermochromic inks from New Prismatic Enterprise Co. Ltd. of Taiwan for yellow, green, red, blue, violet, and other color inks. The arrows indicate the direction of color shift as the ink samples are heated and progress between endpoint colors, from the fully colored color of a first colorant state 350 to nearly colorless color at a second colorant state 355. In FIG. 6A, an example using a Yellow ink or colorant is shown, which also has an intermediate colorant state 360 in addition to the endpoint colors (350 and 355).

Figure 6B:
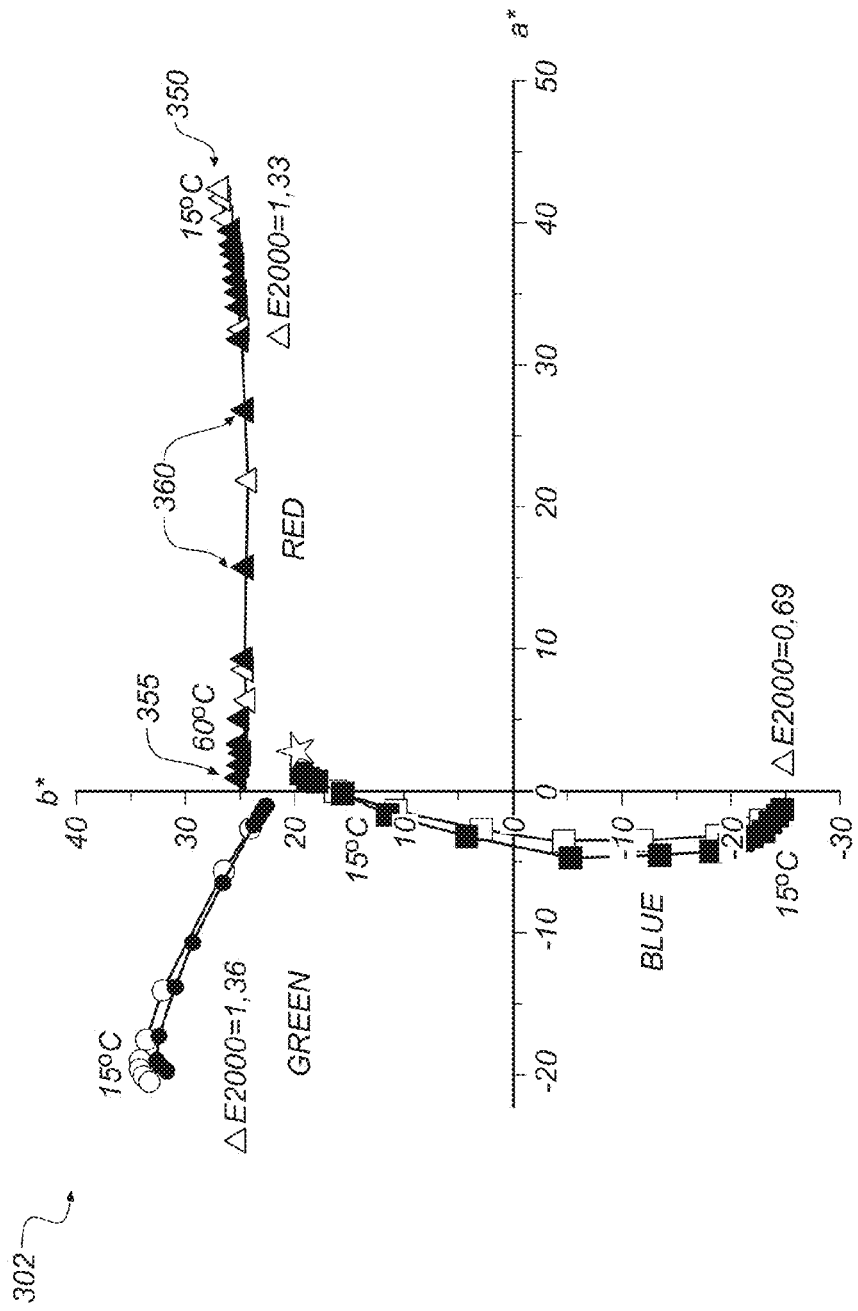

FIG. 6B, which is taken from the Kulcar paper, shows a graph 302 illustrating trajectories the color of reversible red, blue and green thermochromic inks as a function of temperature, using inks from Coates Screen Inks GmBh (Germany) and Sicpa (Switzerland). As can be seen from both FIGS. 6A and 6B, reversible thermochromic inks typically lose color during heating (progressing from first colorant state 350 through intermediate color states 360 to second colorant state 355) and regain it during cooling. At the first colorant state 350, the cold temperature colors or fully colored colors can be pastel in color, or fully saturated colors (or nearly so), depending on the colorant. Both FIGS. also indicate that decolorization may not be complete, and that typically a pale or yellowish tint remains in the heated state or second colorant state 355. The gap between the cooling and heating color trajectories in FIG. 6B is indicative of color hysteresis.

In the examples of FIG. 6B, the thermochromic inks lose color as they progress from cold (15° C.) to hot (60° C.). Thermochromic inks are available that lose color at lower elevated temperatures (such as 31° C. or 45° C.) For example, in using thermochromic inks for the present application, it can be desirable to have the nominal colored state occur at typical comfortable ambient temperatures (e.g., ~20-30° C.) and have the colorless state occur at an elevated temperature which requires deliberate heating to attain. Alternately, the nominal colored state can occur at cold temperatures (such as 8° C.), and the inks are nominally colorless at typical comfortable ambient temperatures. For example, if the thermochromic inks lose color at temperatures above typical comfortable ambient temperatures, the 3D state can occur at ambient temperatures, and as heating occurs, mutable colors are lost, the anaglyph fringing disappears, and the image becomes properly 2D viewable. Alternately, if the thermochromic inks gain color below typical comfortable ambient temperatures, the anaglyph fringing and 3D image can be viewed at cold temperatures, while the anaglyph provides a properly viewable 2D image at normal temperatures. As another example, assuming the use of typical red-cyan glasses, a 2D image can be viewed at the lower temperatures, and as heat is applied, and cyan colors disappear in the mutable portions 430, and process ink based red disparity data (fringing) is revealed to provide at least portions of the 3D viewable image. Similarly, red mutable colorants can transition towards colorless states to reveal process ink based cyan (or green and blue) disparity data or thresholded image difference regions 580 with mutable portions 430 or anaglyph artifacts 84, and other portions of the 3D viewable image.

Figure 6C:
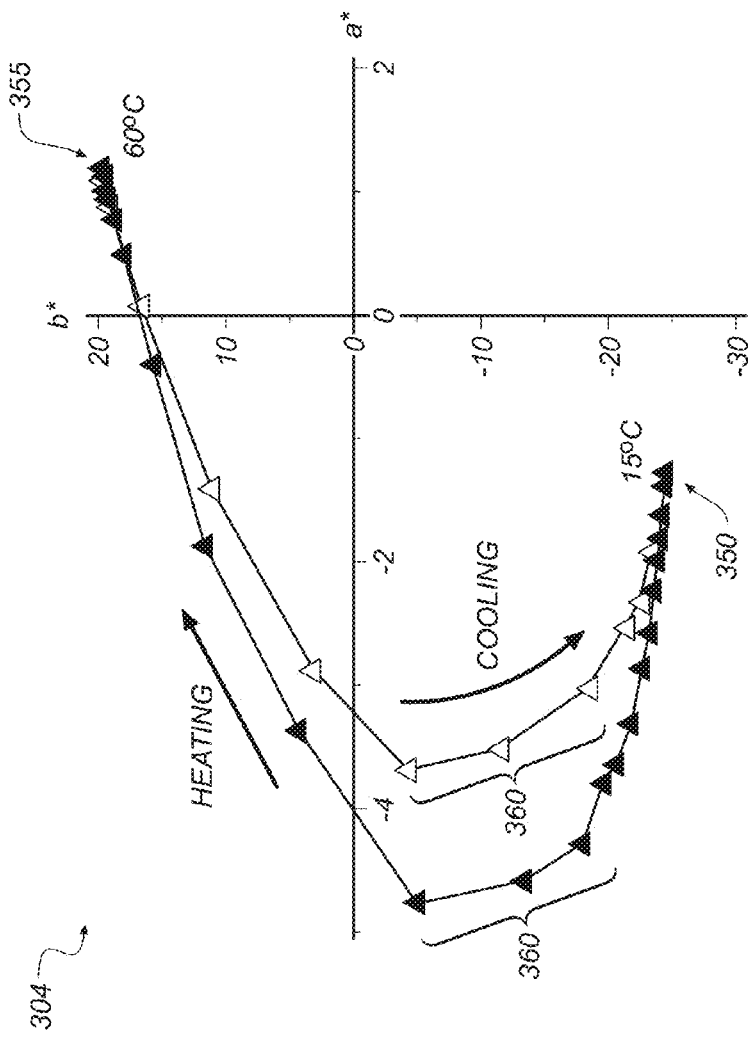

FIG. 6C, also reproduced from Kulcar, shows a scale expanded graph 304 for the blue ink of FIG. 6B that illustrates the hysteresis experienced by reversible thermochromic inks in greater detail. This hysteresis can be substantial, as color trajectories traced out from a first colorant state 350 (cool) to a second colorant state 355 (heated) through the CIELAB color space pass through different intermediate color states 360 during heating than during cooling. Thus, the visibility of color and image content can be manipulated to provide intermediate color states, not just the endpoint color states (such as at hot and cold temperatures). In general, the colorant states corresponding to the image appearance states that provide the 2D or 3D viewable images correspond to the endpoint colors, which for thermochromic inks, are either the hot or cold color states. That said, the design of the printed dynamic anaglyph image 420 can be very temperature stable, where the mutable colorants change colors slightly in response to modest changes in ambient temperature, without the current image state, whether 2D or 3D, being significantly degraded. As the color filters 42 on typical stereo glasses 40 have broad spectra, this is achievable. Additionally, as FIGS. 6B and 6C show, color changes occur non-linearly with temperature change, and small color changes can result from small to modest temperature changes, while large temperature changes are required to produce large color changes.

However, as FIG. 6C also implies, as intermediate colorant states 360 occur, then intermediate anaglyph appearance states can also occur. Certainly, as intermediate colorant states 360 occur briefly during color transitions, they can be hard to use reliably. For this reason, the use of controlled stimulus, whether to consistently drive the mutable colorants to endpoint color states, or to reliably provide intermediate colorant states 360, or to provide sufficient color matching between various mutable image portions or between mutable and immutable image portions, can be valuable. The control of stimulus dosage to attain only endpoint color states is likely less demanding than the control required to reliably provide intermediate color states 360, within appropriate colorimetric tolerances. It is noted that the responsiveness of thermochromic inks can also be graphed in other ways, including as graphs in lightness (L*) vs. temperature.

Figure 6D:
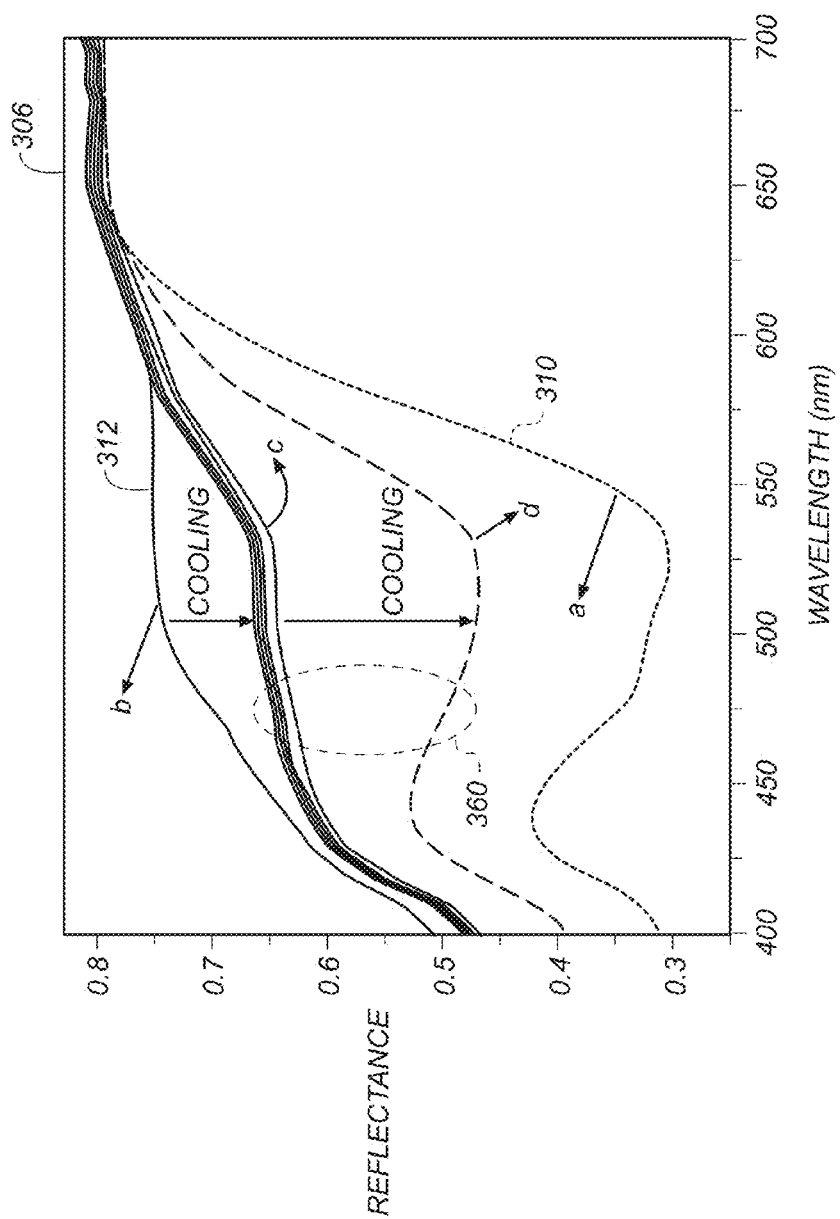
FIG. 6D depicts spectral changes associated with an exemplary thermochromic ink.

The color changes shown in FIGS. 6A-6C occur because the spectral absorption/reflectance/transmittance characteristics of the inks change in response to the applied thermal stimulus. For, example, the paper "*Colorimetric properties of reversible thermochromic printing inks*", by Kulcar et al. (Dyes and Pigments, Vol. 86, pp. 271-277, 2010), provides spectral data for a red thermochromic ink from Coates Screen GmBh. FIG. 6D shows a graph 306 depicting changes in the ink spectral reflectance for this thermochromic ink as a function of temperature. At an initial temperature (a), the unactivated spectral reflectance profile 310 is high in the red, and low in the green and blue; this corresponds to a red color appearance for a first colorant state 350. When the ink is heated to state (b), the activated spectral reflectance profile 312 is high across the whole visible range, although it is slightly lower in the blue. In this state the ink has a clear appearance (with a slight yellow tint) for a second colorant state 355. When the ink is cooled to an intermediate state (c), which is still warmer than state (a), but is somewhat cooler than state (b), the green reflectance has dropped moderately (corresponding to an increase in the green spectral absorbance). In this state, the ink has an intermediate colorant state 360 that is light yellow to light orange in appearance. After further cooling to a second intermediate state (d), the reflectance in the blue and green has dropped significantly, and the intermediate colorant state 360 has a more pronounced reddish coloration.

Figure 6E:
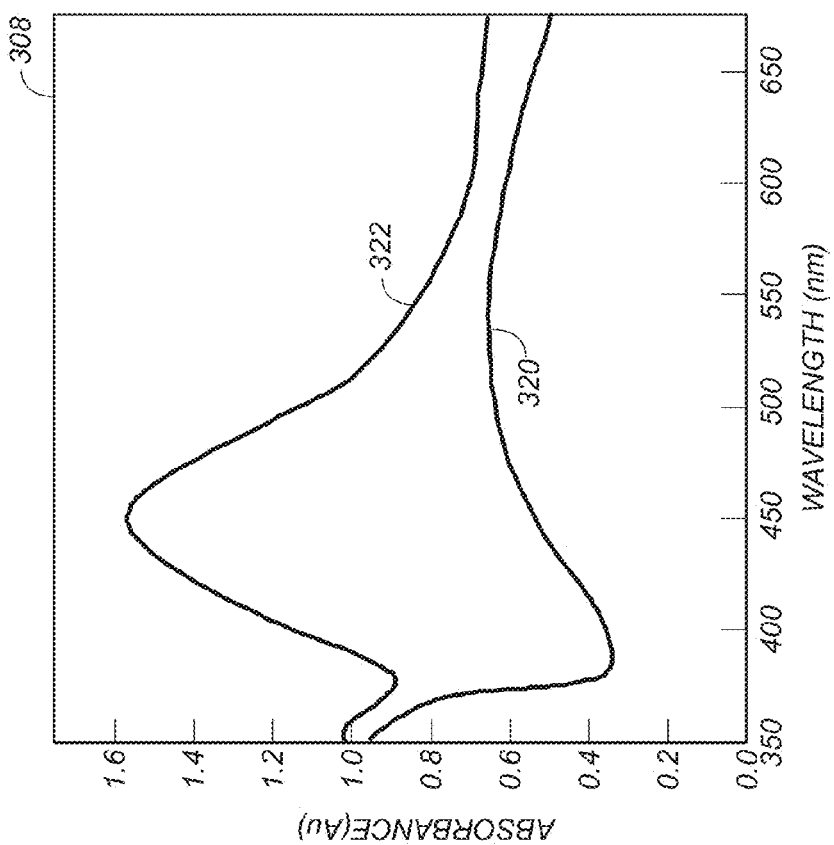
FIG. 6E depicts spectral changes associated with an exemplary photochromic ink.

For brevity, comparable color space diagrams and response curves for photochromic inks are not provided in detail. However, as one example, FIG. 6E shows a graph 308 depicting the changes in light absorption for the Reversacol Flame photochromic dye. It can be seen that an unactivated spectral absorption profile 320 is quite flat and low (having a near neutral tint), which equates to an unactivated resting state, or first colorant state 350, of the ink. With application of an ultraviolet optical radiation stimulus at a wavelength of 380 nm, the high UV absorption of the ink will produce a strong activation of the dye. Once activated, maximum absorption occurs at around 475 nm in the blue region of the spectrum, producing a new activated spectral absorption profile 322. Removal of the blue fraction of the spectrum by the dye results in the ink having a second colorant state 355 that has a red-orange color. Of course, alternate Reversacol dyes, or combinations thereof, such as "Cardinal Red" or "Berry Red", can be used. With respect to the present invention, a printed dynamic anaglyph image 420 can use photochromic inks which are colorless, or nearly so, in their native unactivated state, such that the associated appearance state of the mutable anaglyph provides a 2D image. Then when light stimulus is applied, colors appear that provide the image disparity data or color fringing, and the image attains a 3D viewable appearance state. It is noted that photochromic inks can also experience intermediate colorant states 360, from either intermediate light dosage exposures, or from color fade over time back to the native unactivated color state, although such examples are not shown in FIG. 6E. As with the thermochromic inks, because the color changes occur non-linearly, the colorimetry can be managed so that the 2D and 3D images are stable over a range of mutable color states.

Thus, it can be seen that chromogenic materials or mutable colorants, including thermochromic and photochromic inks, can produce a wide range of controllable color changes when used individually. The range of color change can be expanded when these inks are used in combination, including combining multiple types of thermochromic or photochromic inks (either reversible or irreversible), or combining photochromic inks with thermochromic inks, or combining mutable inks or with normal non-mutable inks. To provide image continuity in the mutable portions 430, these areas can be printed with both mutable and immutable colorants. These abilities can be used for the present purpose to create and controllably alter mutable portions of dynamic printed anaglyph images 420 between multiple appearance states, thereby providing that the perceptual impact of an anaglyph image 50 can be changed between 2D and 3D image states for an observer. Depending on the properties of the respective inks, combination printing can be achieved by over-coating or patterning, such as with halftone or continuous tone dots. Other properties, such as dot gain differences or transparency, can determine which inks are preferentially printed first, and which are printed later, and are nearer the top surface of the printed surface.

As is noted above, hidden messages, either text or machine readable codes (e.g. bar codes, watermarks) can be present as hidden patterns 440 in a printed dynamic anaglyph image 420, as suggested in FIG. 5F. For example, the hidden messages can use one or more colors of mutable inks or colorants which are not applied to the anaglyph image otherwise. At either end point color, whether by color addition or color subtraction, the hidden message(s) can become visible to the observer. Either photochromic or thermochromic inks or pigments can be used to achieve this goal. Hidden messages can also appear only during intermediate appearance states corresponding to intermediate colorant states 360. For example, the rate or slope at which photochromic pigments experience a color transition varies temporally. If two red pigments with similar color spectra are used, one varying quickly and the other more slowly, a hidden message can be seen for intermediate colorant states, but can then be essentially hidden at the endpoint colors (first colorant state 350 and second colorant state 355). Alternately, one pair of stereo glasses 40 with a first pair of filters 42 can be worn to see the 3D anaglyph image while another pair of stereo glasses 40 with a second pair of filters 42 can be worn to see the hidden message(s). In this case, the hidden patterns 440 can be created using mutable colorants that provide color differences to the anaglyph image colors at either intermediate color states or the endpoint color states corresponding to the 3D viewable image appearance state.

Figure 7:
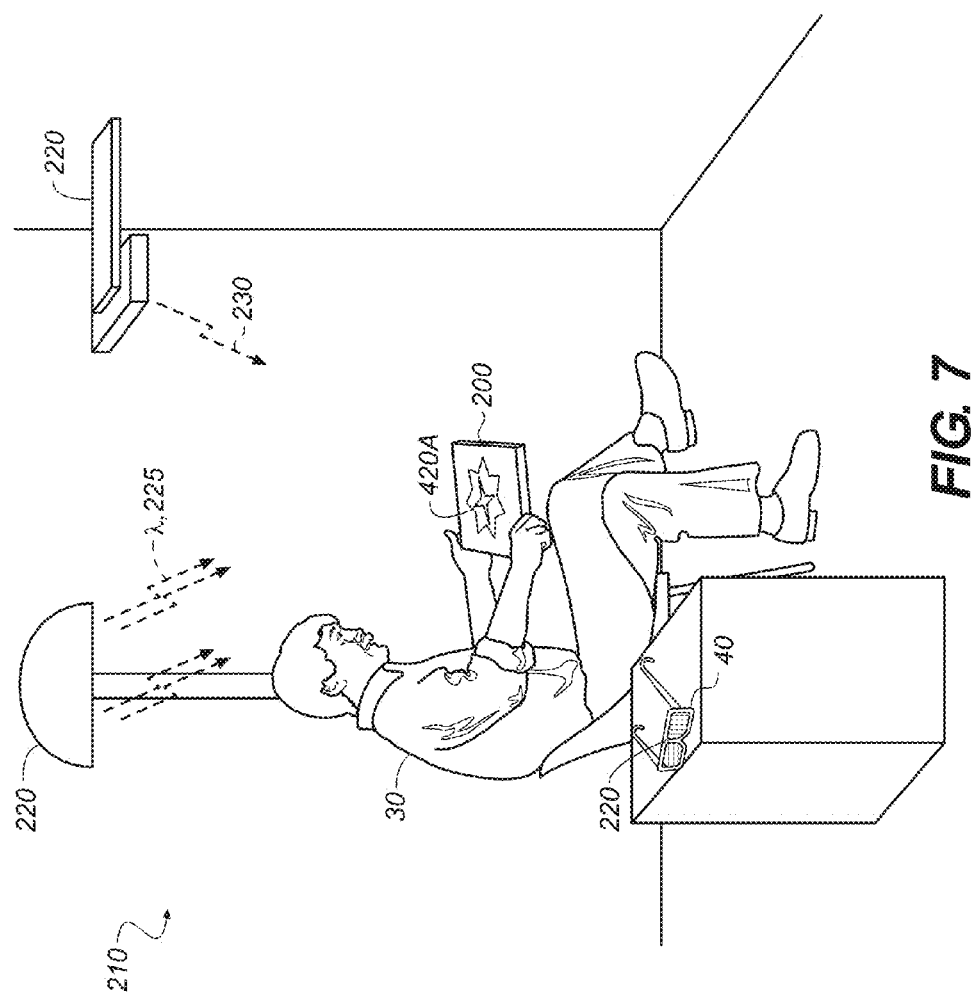
FIG. 7 depicts an observer examining a printed dynamic anaglyph image in accordance with the present invention.

FIG. 7 depicts an observer 30 in a viewing environment 210 interacting with a printed item 200 that includes a printed dynamic anaglyph image 420A. The printed dynamic anaglyph image 420A is nominally viewable under normal visible illumination, for example from daylight, or from fluorescent, incandescent, or LED lights, or a D50 or D65 standard source. A stimulating radiation source 220 provides a stimulus to printed dynamic anaglyph image 420A, thereby changing colorant states and providing two or more anaglyph image appearance states, such as 2D image and 3D image viewing states. Observer 30 can then wear stereo glasses 40 when printed anaglyph image 420 is in a viewing state when anaglyphic artifacts 84 or 3D content in mutable portions 430 are visible. As one example, stimulating radiation source 220 can be a light source that provides an optical radiation stimulus 225 to cause a colorant state change for photochromic pigments that are used to print the mutable portions of the printed dynamic anaglyph image 420A. The optical radiation stimulus 225 can include visible light, or invisible radiation such as ultraviolet or infrared radiation. For example, the light source can be a tungsten light source, a fluorescent light source, light emitting diodes (LEDs), or any other kind of light source including a black light. Alternately, or in addition, the stimulating radiation source 220 can be a heat or cooling source that provides thermal stimulus 230. The stimulating radiation source 220 can be driven by a controller (not shown) within a system that provides controlled stimulus of the printed dynamic anaglyph image 420A. The external stimulus can also be applied with a directional control, for example, by sweeping a beam of light across all or portions of the printed dynamic anaglyph image 420A or the printed item 200 that bears it.

The application of controlled stimulus dosage by apply external stimulus step 450 (or 460) can be advantageous to ensure the desired color states and appearance states are achieved. The controlled parameters can include light dosage (e.g., intensity, exposure time or modulation, spectral bandwidth, direction or patterning) or heat dosage (e.g., intensity, exposure time, direction, or modulation), where the dosages and dosage tolerances can be appropriate to provide endpoint colors or intermediate colors. The temporal exposure parameters can be specified in terms of modulation rate frequency and duty cycle (% time on per pulse). An exemplary stimulus timing diagram is shown in FIG. 8A, having intensity 270, an exposure time 275, and a retention time 280. The modulation frequency is then 1/(exposure time 275+retention time 280) and the duty cycle (%) is 100*exposure time 275/(exposure time 275+retention time 280). For example, for a controlled optical radiation stimulus 225, the dosage parameters can be specified in units of watts (W) or lumens of optical flux, or in terms of irradiance (e.g., mW/cm$^2$), or energy (J), or energy density (e.g., mJ/cm$^2$) delivered, with appropriate tolerances (e.g., ±5%) including illumination uniformity or pattern specifications, as appropriate. The timing diagram of FIG. 8B illustrates that within exposure time 275, the stimulus from a stimulating radiation source 220 can also be pulse width modulated if appropriate. Pulse amplitude modulation can also be used. The timing diagram of FIG. 8C, which is shown in association with the exemplary stimulus cycles of FIGS. 8A and 8B, then depicts an exemplary temporal cycling of a mutable colorant, from a first colorant state 350 to a metastable second colorant state 355, and with intermediate colorant states 360. As shown, timing diagram 8C, with the first colorant state 350 as colorless and second colorant state 355 as colored, can represent color changes for photochromic colorants.

Figure 2A:
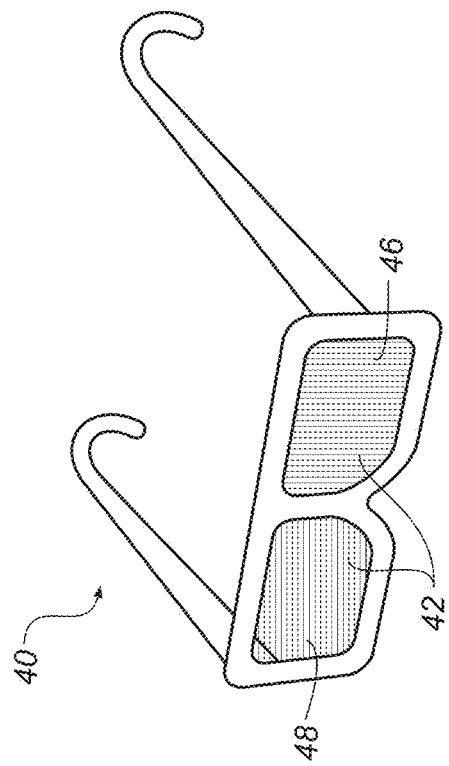
FIG. 2A depicts a pair of stereo anaglyph glasses.
Figure 1D:
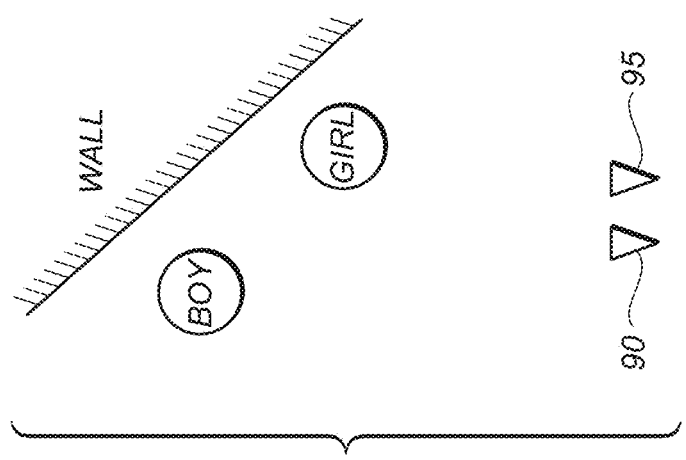
FIG. 1D depicts the position of objects in the scene with respect to the camera positions used to capture the two images from FIGS. 1A and 1B.
Figure 2B:
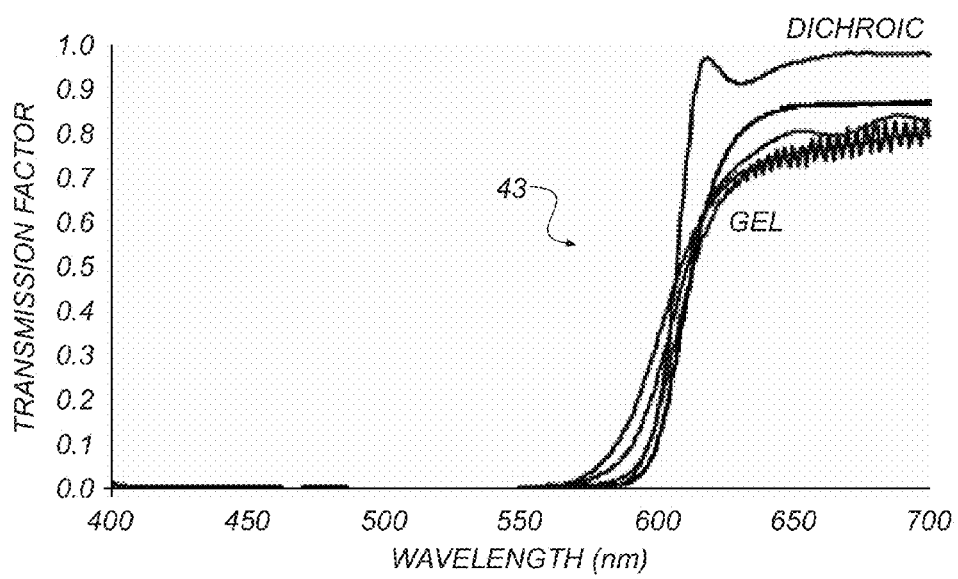
FIG. 2B depicts the transmission spectra of red filters used in stereo glasses.
Figure 2C:
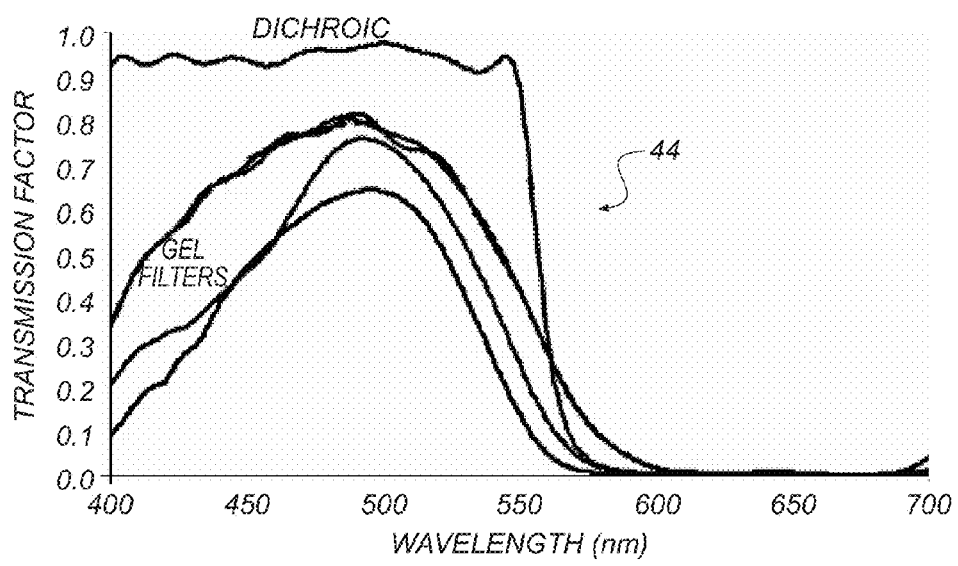
FIG. 2C depicts the transmission spectra of cyan filters used in stereo glasses.
Figure 2D:
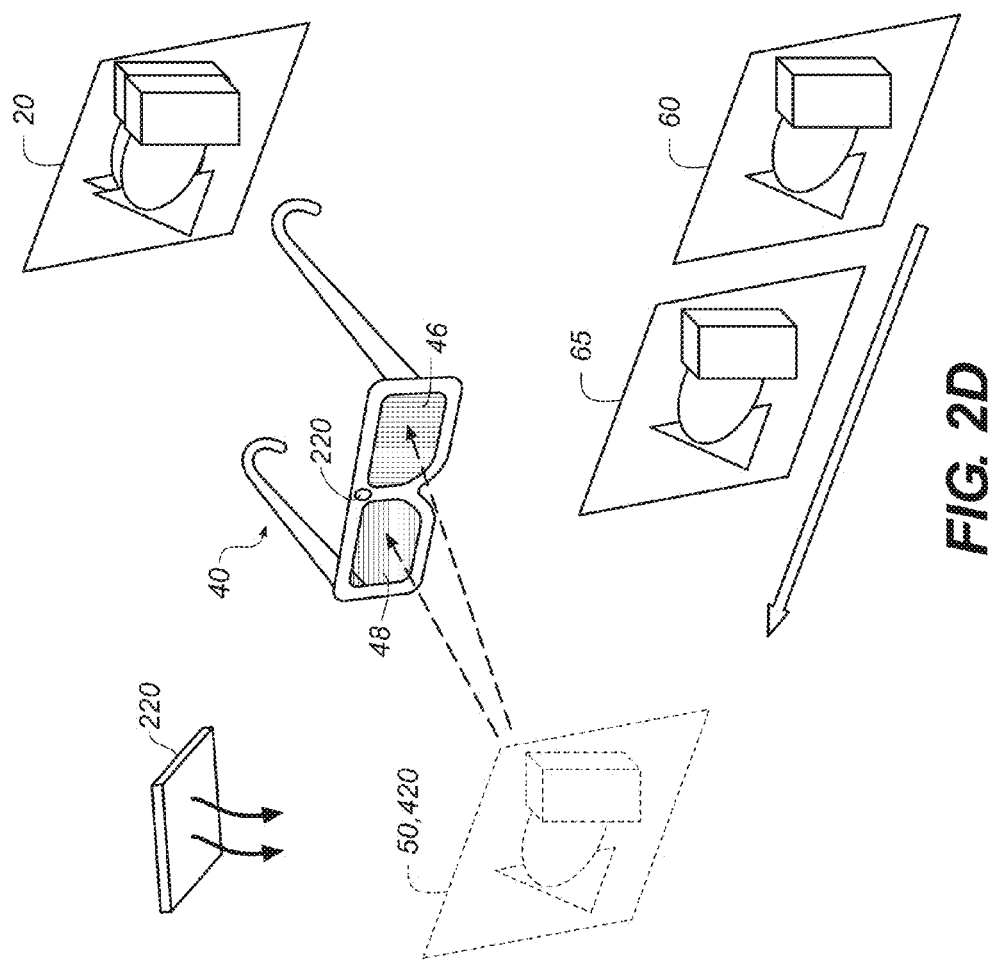
FIG. 2D depicts the integration of anaglyph images to provide a perceived 3D image.

It should be understood that the stimulating radiation source 220 can be an ambient source (such as sunlight or a change in ambient temperature), or a fixed stimulus source (such as a lamp), or a handheld device, or even a source imbedded in the stereo glasses 40 (see FIG. 2A). For example, a thermal stimulus can be applied using other type of heat sources (e.g., using a resistive heater array) positioned closer to the printed item 200. In some embodiments, the printed dynamic anaglyph image 420A can be made using mutable UV responsive inks that are essentially sensitive only to short wavelength UV radiation having wavelengths <300 nm. Alternately, a UV blocking overcoat can be applied for the same effect. In such cases the optical radiation stimulus 225 should include optical radiation at the corresponding wavelengths. This has the useful advantage that the mutable inks will not be activated by the UV radiation in atmospheric-filtered solar radiation. Likewise, although most photochromic colorants or materials are stimulated to exposure by UV light, versions sensitive to IR light have been reported in the literature. In one embodiment of the present invention, photochromic inks which have at least one stimulative bandwidth that resides between ~1400-1500 nm are used and activated by the appropriate IR optical radiation stimulus 225. These inks have the advantage that they cannot be accidently stimulated by daylight, as the spectral profile of atmospherically filtered solar radiation lacks significant light in that spectral band. Alternately, other IR spectral bands, spanning ~1150-1200 nm, at ~980 nm, and at ~790 nm can be used, although the atmospheric filtering is progressively less effective as the stimulating wavelength drops towards the visible wavelength range. Of course, there are also applications, including for artwork, architecture, or environmental sensing, where it can be advantageous to use photochromic inks that respond to ambient light, including visible light, daylight, or general room lights.

For many mutable pigments, the color change response time is a few seconds or less, with some photochromic inks having response times as small as a microsecond. Therefore, an applied external stimulus to the printed content can potentially be modulated at video rates (~30 frames/sec) or faster. However, in general, the perception of anaglyph images requires some concentration, during which an observer perceives the image content itself and then the physiological 3D effect. This process typically takes a few seconds or longer. Therefore any temporal cycling between image or viewing states should generally include a prolonged image retention time 280 (e.g. of many seconds per image) before changing the dynamic printed anaglyph image. As many color mutable inks are metastable, and can retain their color changes for at least several minutes once stimulated, this result is easily achievable. Therefore, the dosage specification for an external stimulus can include temporal modulation parameters, including exposure switching times, image retention times 280, and duty cycles in the case or cyclic exposures that can be applied according to a predefined timing pattern. For example, a colorant can be stimulated with an exposure time 275 of ~30 seconds, to reach the desired activated metastable colorant state for a retention time 280 of 3 minutes, after which the colorant returns to its original colorant state through intermediate colorant states 360 for ~1.2 minutes (see FIG. 8C), whereupon it can be stimulated again, or left in the original state. In this example, the stimulus frequency is ~3.5 mHz and the stimulus duty cycle is ~10%, while the activated colorant state duty cycle is ~62%. It should also be understood that the mutable portions 430 of the printed dynamic anaglyph image 420B can also be activated by other types of external stimulus or by combinations of different types of stimuli, which can include a pressure stimulus (e.g., provided by a touch or by sound waves), or an electrical stimulus, depending on the type of chromogenic colorant used. Also, an external stimulus such as heat or light can also hide or reveal any hidden patterns 440 or information content that is outside of or adjacent to the dynamic anaglyph image 420A, as illustrated by adjacent image content 422 of FIG. 3A.

Figure 9:
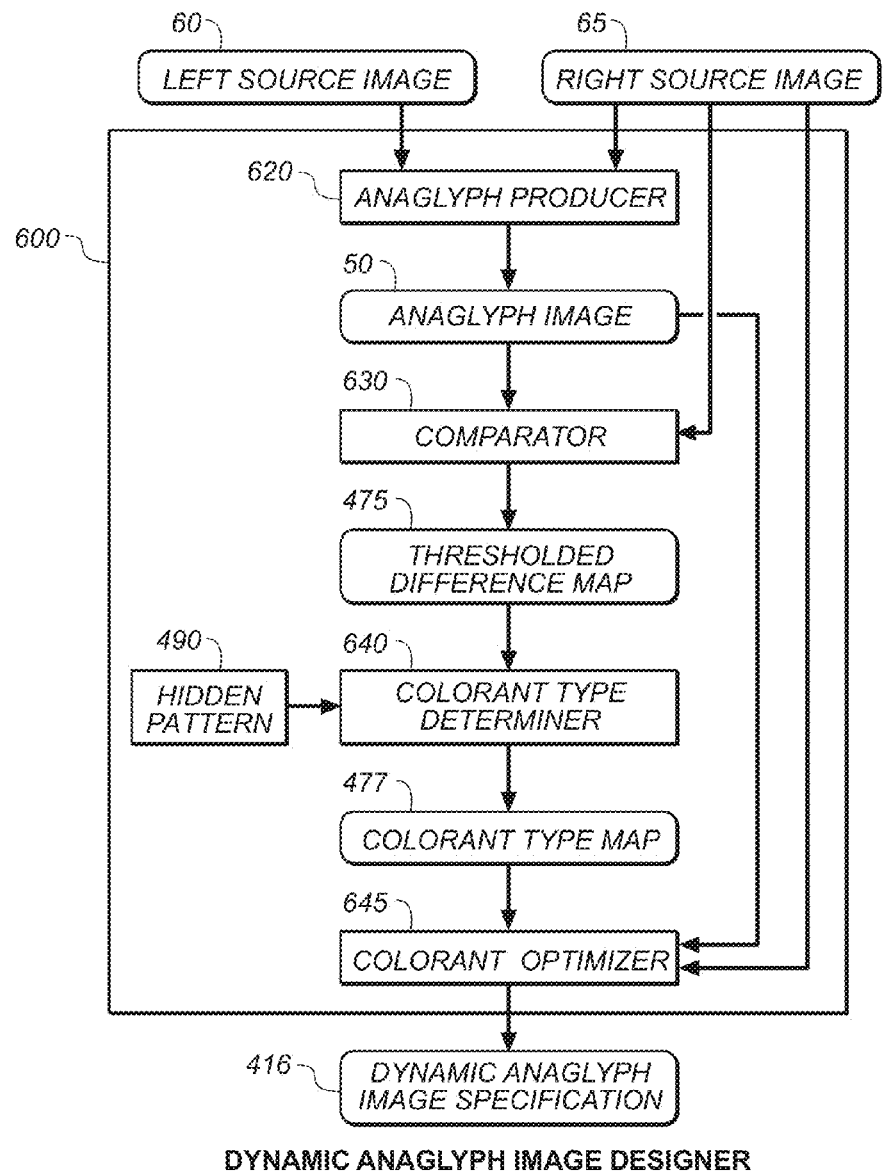
FIG. 9 depicts the function of the dynamic anaglyph image designer used to design the printed dynamic anaglyph.

FIG. 9 expands upon the activity occurring in the design dynamic anaglyph image method 400 shown in FIG. 4, and particularly steps 410, 412, and 414 thereof, by detailing the functions of the dynamic anaglyph image designer 600 that produces a dynamic anaglyph image specification 416 for printing to provide a printed dynamic anaglyph image 420. The dynamic anaglyph image designer 600 is essentially a computer, with processor, image manipulation programs or algorithms, mutable and immutable materials data and user interface, that enables the design dynamic anaglyph image step 410, including the generate difference maps step 412 and designate mutable portions and colorants step 414. Designer 600 can be a stored alone device or it can be integrated into printer 100 in whole or in part. In one embodiment designer 600 comprises data processor 150, memory 188, user input system 184 and output system 194 of printer 100.

The dynamic anaglyph image designer 600 of FIG. 9 is used to adapt an associated image pair, a left source image 60 and a right source image 65, to provide a dynamic anaglyph image specification 416 that can be used to print a printed dynamic anaglyph image 420 having printed anaglyph forming portions printed using mutable colorants that provide appropriate 2D and 3D image quality during the first or second viewing states (475 and 485) respectively. In some embodiments, the printed dynamic anaglyph image 420 can be designed starting from a single original static 2D image (60) or from a pair of single original static 2D images (the left eye and right eye pair, 60 and 65). In particular, the left and right source images 60, 65 can be captured with a stereo (e.g. two lens) camera, captured with a traditional single lens camera by first capturing a left source image 60 of a scene, then shifting the camera position and capturing the right source image 65, or produced by using computer graphic techniques (e.g. computer generated stereo images of a computer graphics scene). These images are received into an anaglyph producer 620, which uses a processor such as the processor of a camera, cellular phone, personal computer, table computer, or the processor associated with a printer such as the data processor 150 of FIG. 5A to produce a conventional anaglyph image 50. This image can be viewed on a display screen 196 or printed by a printer 100, and used as a reference for design and print comparison of the printed dynamic anaglyph image 420. Producing a conventional anaglyph image 50 from left and right source images 60 and 65 is well known in the art.

To further provide a printed dynamic anaglyph image 420 as part of dynamic anaglyph method 400, a comparator 630 within the dynamic anaglyph image designer 600 shown in FIG. 9 is operated to produce a thresholded difference map 575. For example, this is accomplished by using the comparator 630 to first produce a difference map 570 (not shown) that for example indicates the differences between the anaglyph image 50 the right source image 65 or the differences between the left source image 60 and the right source image 65. The thresholded difference map 575 is then produced from the difference map 570, to indicate locations in the image that have a difference greater than a threshold T. In a preferred embodiment, these are the differences between the right source image 65 and the anaglyph image 50. In an exemplary embodiment, threshold T is 20 code values. The aforementioned difference is computed by comparing the code values of similar locations over all color channels of the pair of images being compared.

A colorant type determiner 640 shown in FIG. 9 is then operated against the thresholded difference map 575 to determine the mutable portions 430 and mutable colorants used for the printed dynamic anaglyph image 420. The colorant type determiner 640 produces a colorant type map 590 that indicates, at each location in the image, which type of colorants (mutable or immutable colorants) to use when printing the printed dynamic anaglyph image 420. The colorant type map 590 is produced from the thresholded difference map 575 by applying one or more spatial filters to the thresholded difference maps. For example, the morphological operations of growing or closing can be applied. Also, a lowpass filter, followed by a thresholding operation, can be applied to the thresholded difference map 575 to produce the colorant type map 590. At any given location in the image, the colorant type map 590 can indicate that only immutable colorants are to be used, that only mutable colorants are to be used, or that a combination of mutable and immutable colorants are to be used in a given proportion. If the printed dynamic anaglyph image 420 is to further include a hidden pattern 440, then the design of the colorant type map 590 is modified to specify colorant locations and types accordingly, essentially fulfilling the hidden pattern design step 400 shown in FIG. 4. Thereafter, the colorant optimizer 645 of the dynamic anaglyph image designer 600 shown in FIG. 9 applies color management processes to the colorant type map 590 to produce a dynamic anaglyph image specification 416. The dynamic anaglyph image specification 416 includes at least the anaglyph image data (e.g. the right source image 65), the image difference data, the colorant type map 590, a list of mutable and immutable colorants, and associated print densities versus image position or content that is required from printer 100. The image difference data can be incorporated into the colorant type map 590.

As has been described earlier, in some embodiments a hidden pattern 440 can be provided for inclusion in the printed dynamic anaglyph image 420. The hidden pattern 440 (see FIG. 5F) can be a human readable pattern, including text, ciphered text, or a machine readable pattern that is visible in at least one of the appearance states, including an intermediate appearance state associated with intermediate colorant states. Hidden patterns 440 can be imbedded in a printed dynamic anaglyph image 420 so that they follow contours of the image structure or content. Changes between appearance states can also cause changes in the appearance of hidden text or codes within or adjacent to the anaglyph portion of the printed dynamic anaglyph image 420 with or without causing changes in the perceptual impact of the anaglyph image. The expected appearances of the printed dynamic anaglyph image 420 including any hidden patterns 440, for two or more appearance states, can be provided via the dynamic anaglyph image designer 600 and previewed using a user output system 194 such as a display (FIG. 5A).

It is noted that the image differencing operation provided by comparator 630 can be similar to that done for MPEG compression. In MPEG, the image differencing indicates how to allocate bits to encode the video stream. In this case, for the purpose of producing dynamic printed anaglyph images 420, the difference is used (with further processing) to control the colorants. For example, the image difference map 575 can be smoothed such that the resulting colorant type map 590 does not require colorant switching with very high frequency, (i.e. broad areas of colorant selection are preferable). Furthermore, the pixel differences are screened so that differences smaller than some visual threshold T are considered "static" and those pixels do not need to be able to change.

Thereafter, as shown in FIG. 4, the printer 100 receives the dynamic anaglyph image specification 416, which includes data such as the anaglyph image 50 or image difference data, the right source image 65, and the colorant type map 590 from the dynamic anaglyph image designer 600 and produces the printed dynamic anaglyph image 420. In some regions of the image, as specified by the colorant type map 590, the printer 100 uses conventional (i.e. immutable) colorants in the conventional manner to print the corresponding regions of the right source image 65 (or the anaglyph image 50, or a blended version of the two). In the mutable regions of the image, as specified by the colorant type map 590, the printer 100 selects combinations of colorants (both mutable and immutable) that have the color characteristics of the right source image 65 under a first environmental condition and the color characteristics of the anaglyph image 50 under a second environmental condition (e.g. conditions A 470 and B 480).

Figure 5G:
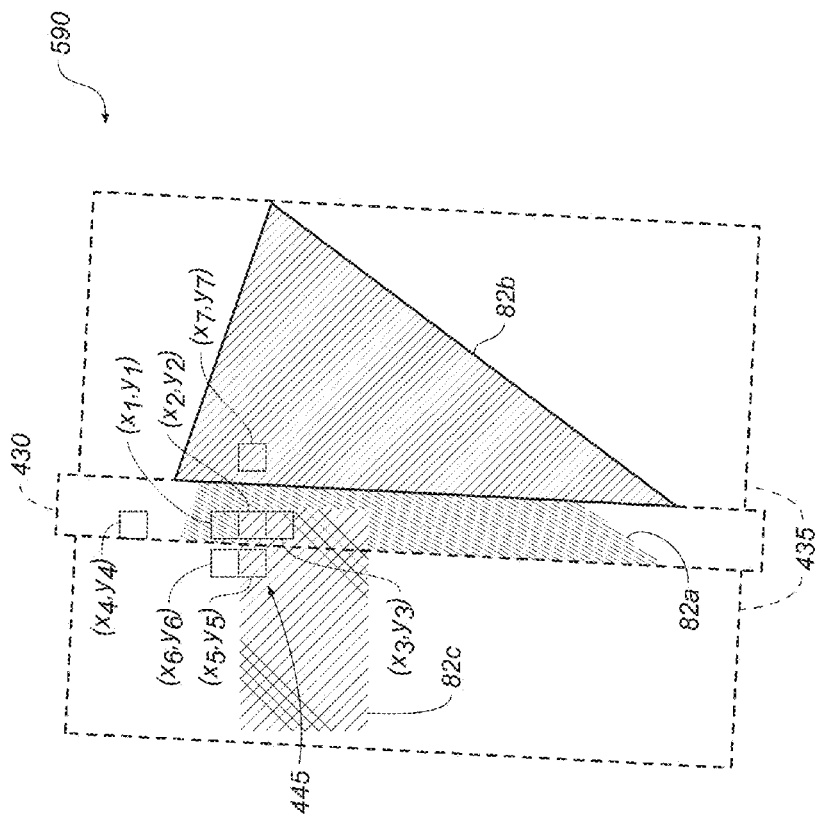
FIG. 5G depicts image detail within and near a mutable portion of an image.

As described, the colorant type map 590 indicates the types of colorants, whether mutable or immutable, that are selectively provided at each position (e.g., a coordinate location (x,y)) on the image for printing the printed dynamic anaglyph image 420 including both the immutable portions 435 and mutable portions 430. FIG. 5G illustrates a portion of a colorant map 590 comprising a series of representative pixels 445 at positions (x,y), for which colorants are specified. Within the depicted mutable portion 430, the shaded area representing image feature 82a represents the 3D anaglyphic content or parallax view associated with the image feature 82b shown in an adjacent immutable portion 435. Within image feature 82b is shown a representative pixel $(x_7, y_7)$, nominally printed with non-mutable colorants as specified by colorant type map 590. Within the depicted mutable portion 430, a series of representative pixels 445, at pixel positions $(x_1,y_1)$, $(x_2,y_2)$, $(x_3,y_3)$ and $(x_4,y_4)$ are shown, which are printed with combinations of mutable and non-mutable colorants, as specified by the colorant type map 590. On the other side of mutable portion 430, a second immutable portion 435 is shown, which partially includes an image feature 82c, as image feature 82c also extends into mutable portion 430. Image feature 82c is an image feature that is present in both the 2d and 3D views, and which lacks significant parallax within both the associated immutable portion 435 and the depicted mutable portion 430. A representative pixel 445 at pixel position $(x_5,y_5)$ resides within image feature 82c and immutable portion 435, but is proximately adjacent to pixels 445 at pixel positions $(x_2,y_2)$ and $(x_3,y_3)$, the latter representing pixels that are within the mutable portion 430, but which also overlap with image feature 82c. Pixel 445 at pixel position $(x_6,y_6)$ also resides within this immutable portion 430, but outside of image feature 82c.

In some image positions, such as pixel positions $(x_5,y_5)$, $(x_6,y_6)$, and $(x_7,y_7)$ within the immutable portions 435, only normal process or non-mutable colorants or inks are required. Within the mutable portion 430, pixel position $(x_1,y_1)$ can be a pixel position with only mutable colorant, while pixel positions $(x_2,y_2)$ and $(x_3,y_3)$ are adjacent or nearby pixel positions having both mutable and non-mutable colorants, as they are included within a portion of image feature 82c, that is hidden during 3D viewing, but present for 2D viewing.

For the pixels 445 at positions $(x_1,y_1)$, $(x_2,y_2)$, and $(x_3,y_3)$ within the mutable portion 430 of FIG. 5O, the application of mutable colorants alters image feature 82a to provide the parallax view of image feature 82b to be viewable as a 3D image feature at these locations, even though image content for image feature 82c protrudes into the area. Thus, the amount of mutable colorant printed to a pixel positions $(x_2,y_2)$ and $(x_3,y_3)$ having underlying immutable colorant can vary from that printed to a nearby pixel position $(x_1,y_1)$ printed with only mutable colorants. Additionally, as image feature 82c can be contiguous but not of uniform color, the amounts of non-mutable colorants printed to the adjacent pixel positions $(x_2,y_2)$ and $(x_3,y_3)$ within mutable portion 430 can vary. Likewise, then the amounts of mutable colorants printed to those same pixel positions for 3D content viewing can also vary. A goal is to provide continuity of appearance for associated pixels [$(x_1,y_1)$, $(x_2,y_2)$, and $(x_3,y_3)$] of an image feature (82b) that has presence for the 3D view to be maintained, enabled by careful selection of the mutable and non-mutable colorants and the quantities thereof. In particular, the goal for 3D viewing is to obtain a sufficiently colored image area or fringe (red for example) within the mutable portion 430 by using the mutable and immutable colorants that object or image content continuity will be maintained and a strong enough signal will be provided to an observer 30 wearing stereo glasses 40 with a filter 42 (red eye filter 43 for example) that sufficient and continuous disparity data will be perceived to enable image fusing. However, it is not necessary that this colored region have a uniform fringe color or uniform mutable colorant printing from one pixel to another. By comparison, pixel 445 at pixel position $(x_4,y_4)$ is within mutable portion 430, but not color or content correlated with pixels 445 at positions $(x_1,y_1)$, $(x_2,y_2)$, and $(x_3,y_3)$. At such pixel positions other mutable color behavior may be required, such as becoming cyan instead of red, becoming colorless, or changing in neutral shading.

As shown in FIG. 5G, it is likewise desirable to have the pixel positions 445 [$(x_2,y_2)$, and $(x_3,y_3)$] within the mutable portion 430 that are associated with image feature 82c be sufficiently color matched with the adjacent or nearby pixel positions $(x_5,y_5)$ associated with that same image feature 82c that have only non-mutable colorants. This can apply to perception for 2D viewing. Most simply, the non-mutable colorants printed at pixel positions $(x_2,y_2)$, $(x_3,y_3)$ and $(x_5,y_5)$ can color match to portray an identical color, or vary as normally, to portray a shaded color area. However, as the mutable colorants tend to have a residual tint in the 'colorless' state, the quantities of normal process or non-mutable inks printed to such pixels [$(x_2,y_2)$, and $(x_3,y_3)$] can be varied from the nominal amounts to produce the target colors for these pixel positions, so as to compensate for this residual tinting. In areas such as that at the $(x_1,y_1)$ pixel position, that are not overlapped with image feature 82c, this residual tinting can raise the floor or base minimum density (Dmin) of the image. At such pixels, small amounts of non-mutable colorants can be applied to provide a neutral coloration. Thus the printed color of pixels [e.g. $(x_6,y_6)$] in the adjacent non-mutable portion 435 can be also altered to provide a better color match. Preferably color matching of pixel positions 445 within a mutable portion 430, such as pixels [$(x_2,y_2)$, and $(x_3,y_3)$], to adjacent or nearby pixel positions from the adjacent non-mutable portion 435, such as pixel $(x_5,y_5)$, that are supposed to have the same color for 2D viewing are color matched to <2 JND. If that image feature 82c, is color shaded, then the goal is to color match these mutable color positions to <2 JND of the target color for the given pixel position for 2D viewing.

Therefore, a color management process is required to adapt the colorant type map 590 which can indicate image regions that have only immutable (normal) colorants, image regions that have only immutable colorants, and image regions that have both types of colorants, to provide a dynamic anaglyph image specification 416 that includes the type and amount of colorants at each pixel position with the image. This is accomplished by the colorant optimizer 645 shown in FIG. 9. For example, at each position (x,y) of the printed dynamic anaglyph image 420 has the color of the right source image 65 (at position (x,y)) under a first environmental condition A 470, and the color (at position (x,y)) of the anaglyph image 50 under a second environmental condition B 480. Generalizing, each pixel position can have a unique combination of colorants [C, M, Y, K, $m_1, m_2, \ldots$], including normal colorants [C, M, Y, K] and mutable colorants [$m_1, m_2, \ldots$]. For example, at a given position (x,y), the right source image 65 has RGB color code values [198 168 128], and at that same position, the anaglyph image 50 has RGB color code values [48 168 128]. At this position, the color difference between the colors exceeds the threshold T, so a combination of mutable and immutable colorants is used with printing the printed dynamic anaglyph image 420. The colorants are chosen as follows: at each (x,y) position in the image, there are two desired colors (the right source image 65 color and the anaglyph image 50 color). Each color represents a desired color appearance of the print, under specified viewing conditions. Adjacent pixels $(x_1,y_1)$ and $(x_2,y_2)$ can have the same colors if they describe the same object or image content, or they may have different colors and still describe the same object or image content. The colorants selected for these pixels of the printed image need to color match well enough to satisfy the continuity of the object or image content. Often, the CIELab colorspace is used to describe the desired color appearance. For the example colors, the CIELab color of the right source image at position (x,y) is code value [70.6 3.4 12.7] and the CIELab color of the anaglyph image at the same position is code value [61.8 −43.8 −0.6].

Next, the colorant optimizer 645 component of the dynamic anaglyph image designer 600 selectively determines the amount of each colorant from each set of colorants [C, M, Y, K, and $m_1, m_2, m_3, \ldots$] to use to print the position at (x,y).

This situation is more complex than the traditional problem of selecting colorants from a set for producing a particular unchanging desired color. In the typical circumstance, color management methods can be used such as described in "*The Reproduction of Colour, Sixth Edition*" by R. W. G. Hunt, by Fountain Press Ltd. ( ) and the "*Digital Color Imaging Handbook*" by Gaurav Sharma, CRC Press (2003). In the present embodiment, the amount of each colorant is determined using optimization techniques, for which spectral (absorbance or reflectance) or colorimetric data describing the colors provided by the mutable and immutable colorants is an input. Data describing color characteristics of mutable colorants that has have spectral absorption characteristics that can be transitioned between a first colorant state and a second colorant state by application of an external stimulus and non-mutable colorants that cannot be transitioned between a first colorant state and a second colorant state by application of the external stimulus with the colorant type map can be stored in memory 188 and accessed as needed during color optimization.

Each non-mutable colorant i has a known spectral reflectance $S_i(\lambda)$. When printed in an amount $\beta_i$ (ranging from 0 (none) to 1.0 (normalized maximum density) onto a base material (e.g. idealized white paper with 100% reflectance), the printed spectral response $S_{\beta i}(\lambda)$ is approximately $(\beta_i S_i(\lambda)+1-\beta_i)$. It is noted that the maximum print density depends on the maximum ink density and the fill factor or coverage of the ink on the paper (as in half toning). When each mutable colorant j, contains a family of spectral reflectance curves $S_{j\alpha}(\lambda)$ where $\alpha$ indicates the activation level or environmental condition. There can be two or more different activation levels (e.g. activated, non-activated, or intermediate activated).

For example, the total spectral response of a subtractive printing system is:

$$S_{tot,\alpha}(\lambda) = \prod_i (\beta_i S_i(\lambda) + 1 - \beta_i) \prod_j (\beta_j S_{j\alpha}(\lambda) + 1 - \beta_j)$$

where $S_{tot,\alpha}(\lambda)$ represents the total spectral reflectance at each wavelength ($\lambda$) at environmental condition level $\alpha$. The values $\beta_i$ and $\beta_j$ indicate the amounts of the immutable and mutable colorants to use to provide the desired hue and saturation for a particular position or pixel of the image. When the colorant type map 590 indicates that only immutable (e.g., traditional cyan, yellow, magenta, and black (CMYK)) colorants are used, the values of $\beta_j$ (which specify amounts of the mutable colorants) are set to zero. To find acceptable values of $\beta_i$ and $\beta_j$, a mathematical or algorithmic optimization is performed by the colorant optimizer 645. The optimization seeks the values of $\beta_i$ and $\beta_j$ that produce a total spectral response $S_{tot,\alpha}(\lambda)$ that corresponds closely to the desired colors (hue, saturation, and lightness) of both the right source image 65 color and the anaglyph image 50 color at the given position for the respective environmental conditions. The optimization can be set up using an objective function that seeks to minimize the sum of squared color differences (often called delta E) between the CIELab values that are desired at a given environmental condition (A 470 or B 480), and the expected CIELab value corresponding to the total spectral response produced by the combination of colorants according to the colorant amounts $\beta_i$ and $\beta_j$. Once the optimization is performed, the results can be stored in a table for future use. A multi-dimensional look-up-table can be used to store the determined colorant amount values.

The dynamic anaglyph image designer 600 of FIG. 9 produces the dynamic anaglyph image specification 416 for the printed dynamic anaglyph image 420 which is then used by printer 100, to print the printed dynamic anaglyph image 420. For example, this dynamic anaglyph image specification 416 can be an image file with specialized metadata, a set of raster image process (RIP) print files that are adapted to the printer, or a modified version of colorant type map 590 that not only indicates the type of colorants with image position, but also the actual colorants [C, M, Y, K, $m_1, m_2, m_3, \ldots$] used, and the quantity or density thereof. The dynamic anaglyph image specification 416 provides for the use of a plurality of colorants, including both immutable colorants and at least one appearance mutable colorants having spectral characteristics that can be controllably switched between a first colorant state and a second colorant state by application of an appropriate external stimulus. This print specification specifies the colorant levels as a function of position for the mutable and immutable colorants, which can be optimized according to the spectral characteristics and other properties of the mutable and immutable colorants and the printing devices used to produce the printed dynamic anaglyph image 420. The colorant levels can be determined via look-up tables, algorithms, or other means to provide an appropriate print specification that will provide the desired appearance states for the printed dynamic anaglyph image 420. Alternately, printer 100 can receive the printed dynamic anaglyph image specification 416 and, in response to information included in the specification; the printer 100 can apply corrections, via look up tables, algorithms, or other means, to determine the colorant levels. The dynamic anaglyph image specification 416 or the printer 100 can also indicate how dot gain, half tone printing, and other ink-deposition an ink-media interaction issues are to be managed. In any case, the dynamic anaglyph image specification 416 insures that the specified appearance states of the mutable portions of the printed dynamic anaglyph image 420 are achieved by appropriate selection of the colorant levels for the plurality of mutable colorants, as well as any immutable colorants. In general, the goal is to achieve appropriate image quality attributes, relative to color matches, color gamut, color accuracy, the presence of intermediate colors, metamerism, resolution, or contrast for the printed dynamic anaglyph image 420 in activated and inactivated states associated with different environmental conditions.

There are particular issues which effect the selection and printing colorants, whether mutable or immutable, for a printed dynamic anaglyph image 420. To expand on this, consider that prior discussions have noted that in the "colorless" state, many mutable colorants have a residual tint. For example, this means that for a given pixel, the amount of colorants $\beta_i$ and $\beta_j$ should be optimized such that the color match of that pixel for the condition that colorant state that is nearly colorless, to nearby associated image content for the same object having the same nominal color, is color matching to within an acceptable amount (see FIG. 5G). Preferably color matching is attained to <1 JND, but higher limits (for example <2-3 delta E or <2-3 JNDs) can be allowed. Color matching applies to image content both within the image difference regions 580 where mutable colorants are applied (mutable portions 430), and also to image content adjacent to these regions (immutable portions 435). If the image area containing this given mutable image pixel and associated immutable pixels is small relative to the overall image area, the color matching tolerances can potentially be relaxed.

Certainly, a printed dynamic anaglyph image 420 can be created using two mutable colorants $m_1$ and $m_2$; one changing between clear and cyan states, and the other changing between clear and red states. In that way, the cyan and red fringes can appear in tandem to provide a 3D viewable image. For a given pixel position (x,y) in a mutable portion 430 where color change is to occur, the mutable and immutable colorants need to be selected in appropriate amounts so that the printed color can transition from Color 1 to Color 2. Comparing the dynamic anaglyph to the 2D image that contributed its blue and green channels to the anaglyph, Colors 1 and 2 are related in that they will always vary along a linear vector in color space (parallel to the red axis). For example, that color change can be for more red or less red (i.e. more cyan). A given mutable colorant will shift in color space along a vector (e.g., much as shown in FIG. 6A), and that mutable colorant in combination with one or more immutable colorants, will shift along a parallel and offset vector.

Alternately, a printed dynamic anaglyph image 420 can be achieved using one colorant with opposite activation responses ($m_i$ and $m_i'$). For example, consider that a colorant 1 version of the colorant changes from RED to CLEAR with increased temperature, while a colorant 2 version of the colorant changes from CLEAR to RED with increased temperature. Then, to achieve a red to cyan shift, the static cyan colorant is printed beneath the changing red. Likewise, to achieve cyan to red shift, the mutable colorant would be printed over the cyan colorant, and would change from CLEAR to RED. In this case, the difference between the anaglyph and the 2D image will be either: a single channel (R), or in 2 channels (B and G), as the anaglyph will always have at least one channel in common with each of the component 2D images.

Anaglyphs can have problems where a colorant used for one eye leaks or has residual response in the spectral bandwidth dedicated to the other eye because of spectral overlap among the filters 42 used for the stereo glasses 40. This can be understood by considering the red filters 43 and cyan filters 44 shown in FIGS. 2B and 2C, where image light in the 550-600 nm range can reach both eyes to greater or lesser extents, depending on the filters and colorants being used. Thus, some light from the right (cyan) color channel can leak through the left (red) eye filter, and some light from the left (red) color channel can leaks into the right (cyan) color channel. As a result, each eye can perceive unintended image content, and this image crosstalk degrades the 3D image quality in anaglyph images by making the images hard to fuse. Crosstalk of the cyan features to the red filtered eye typically dominates, because the cyan or green channel is usually much brighter than the red channel. Thus, the mutable colorants are preferably chosen to provide a strong signal to the associated eye, while reducing crosstalk to the other eye, as seen through that eye's color coding spectral filter 42. Essentially, the integrated reflected spectrum of a mutable colorant should primarily fall within or overlap the intended filter 42 of the stereo glasses 40 (~95% match), while only a fraction (<5%) is available through the filter 42 of the other eye. A given mutable colorant may be used as provided by the supplier, or mixtures may be used in order to balance spectral responses. For example, the red mutable colorant used to produce a printed dynamic anaglyph image 420 can be a mixture of Reversacol Berry Red and Plum Red colorants ($m_1$ and $m_2$), in order to obtain both a sharper cutoff at the yellow to red transition (around 570-580 nm) and less crosstalk in the low blue (<450 nm). This mixture can be used in combination with a mutable colorant $m_3$, such as for example, Reversacol Sea Green for the cyan channel. Mutable colorants that change light absorption in a nominally color neutral fashion, such as Reversacol Graphite, can operate like a mutable "K" colorant to control image densities within mutable portions 430. Mutable colorants that change between states paired with the filters 42 of the stereo glasses 40, such as changing between a cyan color state and a red color state, can also be used for the present invention.

In summary, the printed dynamic anaglyph image 420 has one or more mutable portions. The mutable portions are designed such that when they are changed from a first colorant state to a second colorant state, the printed dynamic anaglyph image 420 progresses from a first appearance state to a second appearance state respectively, wherein changing the printed dynamic anaglyph image 420 between the first and second appearance states affects the perception of a 2D or 3D image by a human observer. More generally, it should be understood that the printed dynamic anaglyph image 420 is an example of a printed dynamic image having regions that change appearance (i.e. spectral characteristics) with an appropriate stimulus or change in the environment. Commonly assigned U.S. Ser. No. 13,181,760 filed Jul. 13, 2011, describes another exemplary printed dynamic image using mutable colorants, but one in which the images are optical illusion images that experience appearance state changes when colorant states are changed in response to applied external stimulus.

It should be understood that the mutable colorants used can be used in various combinations, and can include different combinations of photo chromic pigments or thermochromic pigments for a printed item 200, or using photochromic and thermochromic pigments together in the same printed item. For many applications, using photochromic colorants can be preferable as compared to thermochromic colorants, as the stimulating radiation source 220 can be less obtrusive and provide activation of the printed dynamic anaglyph image 420 from a greater distance. Additionally, photochromic inks or solutions are often much less viscous than thermochromic inks, which makes it easier to print images with fine detail. It should be understood that a printed dynamic anaglyph image 420 can be provided with color mutable inks that preferentially work for color filter pairings other than the classical red-cyan filter pair, including the Anachrome, Mirachrome, trioscopic, and ColorCode color coding schemes discussed previously.

Also the mutable pigments for creating and using dynamic anaglyph images can be advantaged if they have other properties in addition to those previously discussed. As an example, for some applications, it can be desirable to allow printed content including dynamic anaglyph images to change appearance for awhile, but then to have this function permanently disabled, rendering the ink permanently colored or colorless. For example, UV radiation can be applied to many chemicals or mixtures, including some photochromic or thermochromic inks, to break chemical bonds so that color changes are no longer possible. In the case of photochromic inks, this disabling light dosage (wavelength, intensity, and time) provided by a disable anaglyph image step 465 needs to be sufficiently distinct from the activating light dosages that accidental damage is unlikely to occur. As another example, the increased availability of photochromic or thermochromic inks with reduced viscosities can better enable inkjet printing of these inks. Additionally, for some applications, having photochromic inks that transition from colored to colorless states when the light stimulus is applied can be useful. Similarly, irreversible thermochromic inks which provide multiple temperature dependent color states can be useful.

Although in the prior description, the exemplary mutable inks used to provide printed dynamic anaglyph image 420 have been mutable colorants such as those using photochromic or thermochromic dyes, it should be understood that other mutable inks can be used. As another example, electrochromic dyes, which are electro-responsive materials that produce color changes in response to applied electric fields, can be used. In that case, the printed item 200 can include an inexpensive printed circuit, including transparent electrodes, sufficient to selectively apply an electric field across image regions that have mutable portions printed with one or more electro-responsive material(s).

The invention has been described in detail with particular reference to certain preferred embodiments thereof, but it will be understood that variations and modifications can be effected within the scope of the invention. It is emphasized that the apparatus or methods described herein can be embodied in a number of different types of systems, using a wide variety of types of supporting hardware and software. It should also be noted that drawings are not drawn to scale, but are illustrative of key components and principles used in these embodiments.

The invention claimed is:

1. A method for providing a printed dynamic anaglyph image comprising:
    determining left eye information and right eye information representing different perspectives of the same scene;
    accessing data describing color characteristics of mutable colorants that have spectral absorption characteristics that can be transitioned between a first colorant state and a second colorant state by application of an external stimulus and non-mutable colorants that cannot be transitioned between a first colorant state and a second colorant state by application of the external stimulus with the colorant type map;
    analyzing the left eye information and right eye information with an image processor to determine a difference map that defines regions of image difference between the left eye information and the right eye information;
    analyzing the difference map to determine a colorant type map that selectively defines first image regions within the difference map image regions for which a specified plurality of the colorants includes at least one of the mutable colorants having spectral absorption characteristics that can be transitioned between a first colorant state and a second colorant state by application of the external stimulus and at least one of the non-mutable colorant further defines second image regions to be printed with only non-mutable colorants; and
    defining a print specification for the printed dynamic anaglyph image from the colorant type map;
    wherein the at least one mutable colorant and the at least one non-mutable colorant in the colorant type map are selected so that the printed dynamic anaglyph image has a first appearance state in which the at least one mutable colorant is in the first colorant state and is color matched to at least one of the left eye information and the right eye information; and
    wherein the at least one mutable colorant and the at least one non-mutable colorant in the colorant type map are selected so that the printed dynamic anaglyph image has a second appearance state when the mutable colorant is in a second colorant state in which the at least one mutable colorant provides a color that spectrally overlaps a spectral filter in one eye of a pair of stereo color glasses so that three dimensional effects can be perceived.

2. The method of claim 1, wherein the difference map is determined based upon the differences between at least one of the left eye information and the right eye information, the differences between an anaglyph image and the left eye information, and the differences between an anaglyph image and the right eye information, where the anaglyph image is derived from the left eye information and the right eye information.

3. The method of claim 2, wherein the difference map is further analyzed by the processor to determine a thresholded image difference map.

4. The method of claim 3, wherein the thresholded difference map is determined using a threshold that determines a minimum image disparity level for anaglyph rendition.

5. The method of claim 3, wherein the thresholded difference map is determined using a threshold that reduces the amount of mutable colorants used for anaglyph rendition.

6. The method of claim 1, wherein the colorant type map defines the at least one mutable colorant and the at least one non-mutable colorant in the image regions according to the amount and locations of the colorants that are applied.

7. The method of claim 1, wherein the colorant type map further defines the at least one non-mutable colorant in the image regions outside of the regions of image difference.

8. The method of claim 1, wherein the step of defining the print specification includes selectively defining the amounts of the at least one mutable colorant and the at least one non-mutable colorant for one pixel location and the amounts of the at least one mutable colorant and the at least one non-mutable colorant for an adjacent pixel location to color match when these pixels describe associated image content.

9. The method of claim 1, wherein the defined print specification includes at least one of the image difference data, a list of mutable and immutable colorants, associated print densities versus image position, anaglyph image data, image difference data, and right eye information or left eye information.

10. The method of claim 1, wherein the at least one mutable colorant, in the first colorant state, provides the color match to the normal colorants within the first image region or an adjacent second image region that is within two just noticeable differences.

11. The method of claim 1, where the at least one mutable colorant, in the first colorant state in combination with non-mutable colorants, provides the color match to non-mutable colorants in an adjacent second image region.

12. The apparatus of claim 11, where the color match is within two just noticeable differences.

13. The method of claim 1, wherein the at least one mutable colorant, in the second colorant state, provides an integrated spectral reflectance that spectrally overlaps the spectrum of one of the stereo glasses spectra filter to at least 95%.

14. The method of claim 1, wherein the at least one mutable colorant comprises at least one of photochromic colorants, thermochromic colorants, and electrochromic colorants.

15. The method of claim 1, wherein the one or more mutable colorants includes a thermochromic colorant having spectral characteristics that can be transitioned by an external stimulus that is a thermal stimulus.

16. The method of claim 1, where the at least one mutable colorant includes a photochromic colorant having spectral characteristics that can be transitioned by an external stimulus that is an optical radiation stimulus.

17. The method of claim 1, wherein the one mutable colorant is irreversible such that it can only be transitioned from its first colorant state to its second colorant state a single time.

18. The method of claim 1, wherein the printed dynamic anaglyph image includes a hidden pattern that can be perceived in at least one image region having at least one mutable colorant when the at least one image region is in at least one of the first appearance state, the second appearance state, or an intermediate state between the first appearance state and the second appearance state but is not apparent in at least one other appearance state.

19. The method of claim 1, wherein the processor causes the printed dynamic anaglyph image to include at least one machine readable pattern that can be perceived by a machine vision device when the at least one machine readable pattern is in at least one of the first appearance state, the second appearance state, or an intermediate state between the first appearance state and the second appearance state.

20. The method of claim 1, wherein the processor further causes the at least one mutable colorant to include at least two mutable colorants that are different in spectral profile or response time, but which are both associated with the same spectral filter for one eye of the stereo glasses.

21. The method of claim 1, wherein the processor causes the at least one mutable colorants to include at least two mutable colorants that comprise a color coded pair, where one mutable colorant is associated with the spectral filter of one eye of the stereo glasses and the other mutable colorant is associated with another spectral filter for a second eye of the stereo glasses.

22. The method of claim 21, wherein the color coded pair is at least one of a red-cyan filter color pair, a blue-yellow filter color pair, and a green-magenta filter pair.

23. The method of claim 1, wherein the first colorant state and the second colorant state of the at least one mutable colorants differ in at least one of a shape and amplitude of the spectral absorption characteristics.

24. The method of claim 1, wherein the first appearance state and the second appearance state of the at least one mutable portions differ in at least one of a hue, saturation and lightness color appearance characteristic.

25. The method of claim 1, wherein the first colorant state or the second colorant state for the at least one of the mutable colorants is a clear state, a colorless state, a nearly colorless state, and a fully colored color state.

26. The method of claim 1, wherein the external stimulus is provided by a controlled stimulus source or an ambient stimulus source.

27. The method of claim 26, where the external stimulus is controlled according to a predefined timing pattern.

* * * * *